(12) United States Patent
Su et al.

(10) Patent No.: US 12,440,572 B2
(45) Date of Patent: Oct. 14, 2025

(54) FVIII FUSION PROTEIN AND USE THEREOF

(71) Applicant: Zhengzhou Gensciences Inc., Henan (CN)

(72) Inventors: Hongsheng Su, Beijing (CN); Xiaoshan Wang, Beijing (CN); Bin Liu, Beijing (CN); Xian Chen, Beijing (CN); Xiang Li, Beijing (CN); Luyan Zhu, Beijing (CN); Shuya Wang, Kaifeng (CN); Shuang Wang, Beijing (CN); Wenwen Wang, Kaifeng (CN); Lingli Huang, Kaifeng (CN); Qilei Wang, Kaifeng (CN); Haitao Hu, Kaifeng (CN); Lili Zhang, Kaifeng (CN); Jie Gao, Kaifeng (CN); Zijia Ren, Kaifeng (CN); Chunfeng Xiao, Beijing (CN); Yali Wang, Beijing (CN)

(73) Assignee: ZHENGZHOU GENSCIENCES INC., Zhengzhou (CN)

( * ) Notice: Subject to any disclaimer, the term of this patent is extended or adjusted under 35 U.S.C. 154(b) by 1371 days.

(21) Appl. No.: 17/055,403

(22) PCT Filed: May 16, 2019

(86) PCT No.: PCT/CN2019/087156
§ 371 (c)(1),
(2) Date: Nov. 13, 2020

(87) PCT Pub. No.: WO2019/219049
PCT Pub. Date: Nov. 21, 2019

(65) Prior Publication Data
US 2021/0361775 A1    Nov. 25, 2021

(30) Foreign Application Priority Data
May 18, 2018   (CN) .......................... 201810481941.X

(51) Int. Cl.
| | | |
|---|---|---|
| A61K 47/00 | (2006.01) | |
| A61K 38/37 | (2006.01) | |
| A61K 47/54 | (2017.01) | |
| A61K 47/60 | (2017.01) | |
| A61P 7/04 | (2006.01) | |

(52) U.S. Cl.
CPC .............. *A61K 47/60* (2017.08); *A61K 38/37* (2013.01); *A61K 47/545* (2017.08); *A61P 7/04* (2018.01); *C07K 2319/31* (2013.01)

(58) Field of Classification Search
CPC ...... A61K 47/60; A61K 38/37; A61K 47/545; A61P 7/04; C07K 2319/31
See application file for complete search history.

(56) References Cited

U.S. PATENT DOCUMENTS

| 4,818,679 A | 4/1989 | Chasin et al. |
|---|---|---|
| 9,096,656 B2 | 8/2015 | Pan et al. |
| 10,023,624 B2 | 7/2018 | Hou et al. |
| 10,246,503 B2 | 4/2019 | Qian et al. |
| 10,537,616 B2 | 1/2020 | Horn et al. |
| 2009/0076237 A1 | 3/2009 | Turecek et al. |
| 2012/0322738 A1 | 12/2012 | Behrens et al. |
| 2013/0040889 A1* | 2/2013 | Bolt .................... C07K 14/755 514/14.1 |
| 2013/0150302 A1 | 6/2013 | Henry |
| 2015/0023959 A1 | 1/2015 | Chhabra et al. |
| 2016/0000884 A1 | 1/2016 | Rischel et al. |
| 2016/0200794 A1 | 7/2016 | Metzner et al. |
| 2019/0330311 A1 | 10/2019 | Oh et al. |
| 2019/0365867 A1 | 12/2019 | Li et al. |

FOREIGN PATENT DOCUMENTS

| CN | 103172745 A | 6/2013 |
|---|---|---|
| CN | 104271150 A | 1/2015 |
| CN | 104519912 A | 4/2015 |
| CN | 104645347 A | 5/2015 |
| CN | 105153313 A | * 12/2015 |
| CN | 105163751 A | 12/2015 |
| CN | 105524164 A | 4/2016 |
| CN | 106279437 A | 1/2017 |
| JP | 2001510053 A | 7/2001 |
| JP | 2014531910 A | 12/2014 |
| RU | 2012144555 A | 6/2011 |
| RU | 2423380 C2 | 7/2011 |
| WO | 9415625 A1 | 7/1994 |
| WO | 9904026 A2 | 1/1999 |
| WO | 2006127896 A2 | 11/2006 |
| WO | 2010083536 A1 | 7/2010 |
| WO | 2011101284 A1 | 8/2011 |
| WO | 2013057219 A1 | 4/2013 |
| WO | 2013106787 A1 | 7/2013 |
| WO | 2014008480 A2 | 1/2014 |
| WO | 2017117631 A1 | 7/2017 |
| WO | 2017222337 A1 | 12/2017 |

OTHER PUBLICATIONS

Röstin, J., et al., "B-domain deleted recombinant coagulation factor VIII modified with monomethoxy polyethylene glycol," Bioconjugate Chemistry, American Chemical Society, May 1, 2000, vol. 11(3), pp. 387-396, XP002635268.

(Continued)

*Primary Examiner* — Jeanette M Lieb
(74) *Attorney, Agent, or Firm* — Buchanan Ingersoll & Rooney PC

(57) ABSTRACT

Disclosed are a coagulation factor VIII fusion protein which is conjugated with polyalkylene glycol and which has an extended cyclic half-life, a preparation method therefor and a use thereof, wherein the active moiety of the coagulation factor VIII is directly linked or indirectly linked by a peptide linker to a fusion partner, and the fusion protein is further conjugated to a polyalkylene glycol. The half-life is significantly increased compared to an FVIII fusion protein modified without polyalkylene glycol.

10 Claims, 8 Drawing Sheets
Specification includes a Sequence Listing.

(56) References Cited

OTHER PUBLICATIONS

Extended European Search Report for European Application No. 19 804 136.0, dated Mar. 23, 2022, 10 pages.
Japanese Notice of Reasons for Refusal for Japanese Application No. 2020-564649, dated Nov. 23, 2021 with translation, 6 pages.
Russian Office Action issued in Russian Application No. 2020139091/10, dated Jul. 9, 2021 with translation, 15 pages.
International Search Report and Written Opinion for International Application No. PCT/CN2019/087156, mailed Aug. 14, 2019, with partial translation, 30 pages.
Wufuer, Y. "GPVI-Fc-PEG improves cerebral infarct volume and cerebral thrombosis in mouse model with cerebral thrombosis", Molecular Medicine Reports, Dec. 31, 2017, vol. 16, pp. 7561-7568.
Dumont et al., "Prolonged Activity of a Recombinant Factor VIII-Fc Fusion Protein in Hemophilia A Mice and Dogs", Blood, 2012, vol. 119, No. 13, pp. 3024-3030.
Powell et al., "Safety and Prolonged Activity of Recombinant Factor VIII Fc Fusion Protein in Hemophilia A. Patients", Blood, 2012, vol. 119, No. 13, pp. 3031-3037.
Peters et al., "Biochemical and Functional Characterization of a Recombinant Monomeric Factor VIII-Fc Fusion Protein", Journal of Thrombosis and Haemostasis, 2013, vol. 11, pp. 132-141.
Tiede et al., "Enhancing the Pharmacokinetic Properties of Recombinant Factor VIII: First-In-Human Trial of GlycoPEGylated Recombinant Factor VIII in Patient with Hemophilia A", Journal of Thrombosis and Haemostasis, 2013, vol. 11, pp. 670-678.
Turecek et al., "BAX 855, A PEGylated rFVIII Product With Prolonged Half-Life, Development, Functional and Structural Characterisation", Hämostaseologie, 2012, vol. 32, Suppl. 1, pp. S29-S38.
Jiang et al., "Progress in the Study on Structure Modification of Recombinant Factor VIII", Pharmaceutical Biotechnology, 2015, vol. 22, No. 1, pp. 69-73 with English abstract (p. 73).

\* cited by examiner

FVIII FUSION PROTEIN AND USE THEREOF

CROSS REFERENCE TO RELATED APPLICATIONS

This application is a U.S. National Phase application based upon PCT Application No. PCT/CN2019/087156, filed May 16, 2019, which claims the priority of Chinese patent application 201810481941.X filed to the Chinese Patent Office on May 18, 2018, titled "IMPROVED FVIII FUSION PROTEIN AND USE THEREOF", the content of which is incorporated herein by reference in its entirety.

FIELD

The present disclosure relates to the field of recombinant human coagulation factor VIII fusion proteins, in particular to a fusion polypeptide with prolonged half-life, and a preparation method and use thereof.

BACKGROUND

Hemophilia A is a hereditary bleeding disorder caused by the insufficient activity or dysfunction of coagulation factor VIII (FVIII), and for which, supplement of active FVIII is an effective therapy treatment. The FVIII gene is one of the longest gene cloned so far, and FVIII molecule is a protein drug with the largest molecular weight used in clinical practice. FVIII protein comprises 6 domains: three A domains (A1, A2, A3), a non-essential central domain (B-domain) and two C domains (C1, C2). The expression level of recombinant FVIII in vitro is significantly lower than that of other genes with similar properties. For example, the expression level of FVIII is only 1% of that of FIX. In addition, because the short half-life of FVIII in the blood, only 8-12 hours, patients with severe hemophilia A must be given preventive treatment and must be injected intravenously (i.v.) about 3 times a week.

A monomer-dimer hybrid recombinant FVIII-Fc fusion protein (Eloctate) developed by Bioverativ (US) was approved for marketing by the US FDA in June 2014. Clinical data shows that its half-life in the human body is only extended by 1.5 to 1.7 times (Dumont J A et al., Blood, 2012, 119: 3024-3030; Powell J S et al., Blood, 2012, 119: 3031-3037), and injection is needed every 3 to 5 days. However, in HEK-293 cells transfected with dual expression vector of rFVIII Fc and Fc constructed by Bioverativ, rFVIIIFc homodimers were not detected in the expression products as expected, and only monomer-dimer hybrid rFVIIIFc fusion protein and Fc dimer were expressed. For this, the researchers of the company speculated that, the host cell failed to secrete the rFVIIIFc homodimer protein with a molecular weight of about 400 kDa due to the excessive molecular weight of the homodimer, or the rFVIIIFc monomers failed to polymerize due to the steric hindrance. (Peters R T et al., J Thromb Haemost, 2013, 11(1): 132-41). It can be seen that the production of FVIII fusion protein in homodimer form is quite difficult.

For the preparation of long-acting formulations of protein drugs, polymers with high solubility (such as polyethylene glycol (PEG)) are conventionally used to chemically modify the surface of protein drugs. Generally, the higher the modification rate, the more obvious the reduction of protein antigenicity and activity. Examples of use of polyethylene glycol (PEG) to extend the half-life of FVIII have been reported, for example, Novonordisk (N8-GP), Bayer (BAY94-9027) and Baxter (Bax 855) have all developed PEGylated long-acting FVIII products which have entered clinical research. However, pharmacokinetic research data showed that PEGylated FVIII did not obtain a significantly prolonged half-life (Tiede A et al., J Thromb Haemost. 2013; 11: 670-678); (Coyle T et al., Haemophilia. 2012; 18(Suppl 3): 22); (Turecek P L et al., Hamostaseologie, 2012, 32 Suppl 1: S29-38).

The strategies for developing long-acting protein drugs include glycosylation, PEGylation, forming fusion protein with albumin, transferrin, Fc, XTEN and so on. Currently, commercial long-acting drugs only use one of the above strategies to extend the half-life of protein. There is no literature report on the combination of two or more of the above strategies, especially the combination of PEGylation and fusing with protein, and there is no literature reporting that two or more strategies can make the half-life longer than when a single strategy is adopted.

Patients with hemophilia need a life-long transfusion of coagulation factors to stop bleeding and prevent bleeding. Therefore, researchers continuously seek coagulation factors with a longer half-life to reduce the number of administrations. In addition, how to maintain good biological activity while extending the half-life is a difficult problem faced by researchers.

SUMMARY

After years of research and long-term experiments, the inventors found that, when coagulation factor VIII is fused with a fusion partner (such as Fc segment, albumin, XTEN or transferrin), and the resulting fusion protein is further conjugated with a polymer, such as polyalkylene glycol, for example, PEG, including mPEG, which can effectively improve the stability of the protein in vivo, especially when the conjugated part has a branched structure, and when the molecular weight of the conjugated part is greater than or equal to 35 kDa, such as 40 kDa. On this basis, the present disclosure was completed.

The present disclosure provides the following technical solutions.

1. A polyalkylene glycol-conjugated coagulation factor VIII fusion protein, which is a coagulation factor VIII fusion protein conjugated with polyalkylene glycol, wherein the coagulation factor VIII (FVIII) as active moiety is directly linked or indirectly linked by a peptide linker to a fusion partner for prolonging half-life to form the fusion protein, and the fusion protein is further conjugated to a polyalkylene glycol.

2. The polyalkylene glycol-conjugated coagulation factor VIII fusion protein according to one embodiment, wherein the coagulation factor VIII as the active moiety is derived from humans, such as full-length or truncated human coagulation factor VIII (for example, human B-domain deleted coagulation factor VIII); wherein the full-length or truncated human coagulation factor VIII may contain 1 or more amino acid mutations, provided that it still retains the FVIII activity, for example, the coagulation factor VIII as the active moiety comprises the amino acid sequence shown in SEQ ID NO: 1 or 2, or has at least 90%, 95% or higher identity to the amino acid sequence shown in SEQ ID NO: 1 or 2.

3. The polyalkylene glycol-conjugated coagulation factor VIII fusion protein according to another embodiment, wherein the fusion partner is an immunoglobulin Fc fragment, albumin, transferrin, or)(TEN, and the fusion partner is derived from, for example, human, preferably an IgG Fc fragment, for example, an IgG Fc fragment with reduced ADCC effect and/or CDC effect and/or enhanced binding affinity to the FcRn receptor, more preferably an IgG Fc fragment having an amino acid sequence selected from:

(i) the amino acid sequence shown in SEQ ID NO: 3, (ii) the amino acid sequence shown in SEQ ID NO: 4, and (iii) the amino acid sequence shown in SEQ ID NO: 5.

4. The polyalkylene glycol-conjugated coagulation factor VIII fusion protein according to some embodiments, wherein the polyalkylene glycol is polypropylene glycol or polyethylene glycol;

the polyalkylene glycol may be end-capped, for example, end-capped with an alkoxy group such as methoxy;

the polyalkylene glycol is linear or branched, preferably branched, for example branched polyethylene glycol, especially branched methoxy-terminated polyethylene glycol;

the molecular weight of the polyalkylene glycol can be ≥1, ≥10, ≥20, ≥30, ≥40, ≥50, ≥60, ≥70, ≥80, ≥90, ≥100, ≥110, ≥120, ≥130, ≥140, ≥150 or ≥160 kDa, for example 5, 10, 20, 30, 40, 50, 60, 70, 80, 90, or 100 kDa, or between any two of the values.

5. The polyalkylene glycol-conjugated coagulation factor VIII fusion protein according to some embodiments, wherein the conjugation position of the fusion protein and polyalkylene glycol is at a random or specific position, and the conjugation position is selected from the group consisting of a free amino group, sulfhydryl group, sugar group and/or carboxyl group, preferably free amino group.

6. The polyalkylene glycol-conjugated coagulation factor VIII fusion protein according to another embodiment, wherein a modifier, that is, polyalkylene glycol or a modified polyalkylene glycol in this specification, is used for the conjugation, and the modifier may be in the form of an activated ester, for example, the modifier is selected from modifiers represented by formula (1), (2) and (3):

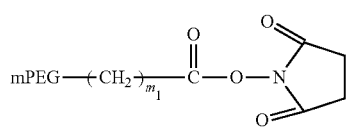

(1)

wherein 0≤m1≤6, and m1 is preferably 5; and mPEG represents a monomethoxy terminated polyethylene glycol group;

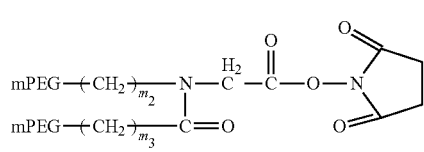

(2)

wherein 0≤m2≤6, and m2 is preferably 2; 0≤m3≤6, and m3 is preferably 1; and mPEG represents a monomethoxy terminated polyethylene glycol group; or

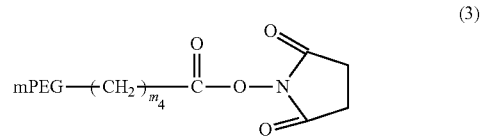

(3)

wherein, 0≤m4≤6, and m4 is preferably 2; and mPEG represents a monomethoxy-terminated polyethylene glycol group.

7. The polyalkylene glycol-conjugated coagulation factor VIII fusion protein according to some embodiments, wherein the coagulation factor VIII active moiety is linked to the fusion partner via a peptide linker, and the peptide linker includes a flexible peptide segment and/or a rigid peptide segment, for example including 1, 2, 3, 4, 5 or more of the rigid peptide segments.

8. The polyalkylene glycol-conjugated coagulation factor VIII fusion protein according to another embodiment, wherein the flexible peptide segment comprises 2 or more amino acid residues selected from glycine, serine, alanine and threonine, preferably, the flexible peptide segment has a general formula $(GS)_a(GGS)_b(GGGS)_c(GGGGS)_d$, wherein a, b, c and d are integers greater than or equal to 0, and a+b+c+d≥1, more preferably, the flexible peptide segment has a sequence selected from the group consisting of:

(i)
(SEQ ID NO: 6)
GSGGGSGGGGSGGGGS;

(ii)
(SEQ ID NO: 7)
GSGGGGSGGGGSGGGGSGGGGSGGGGS;

(iii)
(SEQ ID NO: 8)
GGGGSGGGGSGGGGSGGGGS;

(iv)
(SEQ ID NO: 9)
GSGGGGSGGGGSGGGGSGGGGSGGGGSGGGGSGGGGS;
and (v)
(SEQ ID NO: 10)
GGGSGGGSGGGSGGGSGGGS.

9. The polyalkylene glycol-conjugated coagulation factor VIII fusion protein according to some embodiments, wherein the rigid peptide segment is the carboxy terminal peptide of human chorionic gonadotropin β subunit, or the rigid peptide segment has at least 70%, 80%, 90%, 95% or higher identity to the carboxy terminal peptide of human chorionic gonadotropin β subunit; the rigid peptide segment may comprises 1, 2 or more glycosylation sites;

preferably, the rigid peptide segment comprises an amino acid sequence selected from:

(i)
(SEQ ID NO: 11)
PRFQDSSSSKAPPPSLPSPSRLPGPSDTPILPQ;

(ii)
(SEQ ID NO: 12)
SSSSKAPPPSLPSPSRLPGPSDTPILPQ;

-continued (iii)
```
                                            (SEQ ID NO: 13)
SSSSKAPPPS;
```
and (iv)
```
                                            (SEQ ID NO: 14)
SRLPGPSDTPILPQ;
``` more preferably, the peptide linker comprises the amino acid sequence shown in SEQ ID NO: 15.

10. A pharmaceutical composition comprising an effective amount of the conjugate of the present disclosure, and a pharmaceutically acceptable carrier.

11. A method for preventing and/or treating hemorrhagic diseases, comprising administering to an subject in need thereof the conjugate of the present disclosure or the pharmaceutical composition of the present disclosure, wherein the hemorrhagic diseases are preferably selected from hemorrhagic diseases in patients with congenital or acquired deficiency of FVIII, and spontaneous or surgical bleeding in patients with hemophilia A.

12. A method for improving the half-life of coagulation factor VIII, wherein the coagulation factor VIII active moiety is directly linked or indirectly linked by a peptide linker to a fusion partner for prolonging half-life, and then is further conjugated to a polyalkylene glycol.

13. The method according to an embodiment, wherein the fusion partner is an immunoglobulin Fc fragment, albumin, XTEN or transferrin, and the fusion partner is derived from, for example, human, preferably an IgG Fc fragment, for example, an IgG Fc fragment with reduced ADCC effect and/or CDC effect and/or enhanced binding affinity to the FcRn receptor, more preferably an IgG Fc fragment having an amino acid sequence selected from:
  (i) the amino acid sequence shown in SEQ ID NO: 3,
  (ii) the amino acid sequence shown in SEQ ID NO: 4, and
  (iii) the amino acid sequence shown in SEQ ID NO: 5.

14. The method according to some embodiments, wherein
  the polyalkylene glycol is polypropylene glycol or polyethylene glycol;
  the polyalkylene glycol may be end-capped, for example, end-capped with an alkoxy group such as methoxy;
  the polyalkylene glycol is linear or branched, preferably branched, for example branched polyethylene glycol, especially branched methoxy-terminated polyethylene glycol;
  the molecular weight of the polyalkylene glycol can be ≥1, ≥10, ≥20, ≥30, ≥40, ≥50, ≥60, ≥70, ≥80, ≥90, ≥100, ≥110, ≥120, ≥130, ≥140, ≥150 or ≥160 kDa, for example 5, 10, 20, 30, 40, 50, 60, 70, 80, 90, or 100 kDa, or between any two of the values.

15. The method according to some embodiments, wherein the conjugation of the fusion protein and polyalkylene glycol is at a random or specific position, and the conjugation position is selected from the group consisting of a free amino group, sulfhydryl group, sugar group and carboxyl group, preferably free amino group.

16. The method according to some embodiments, wherein a modifier, that is, polyalkylene glycol or a modified polyalkylene glycol in this specification, is used for the conjugation, and preferably the modifier may be in the form of an activated ester, more preferably, the modifier is selected from modifiers represented by formula (1), (2) and (3)
  wherein any activated ester form modifier is used for the conjugation, for example, for example, the modifier is selected from modifiers represented by formula (1), (2) and (3):

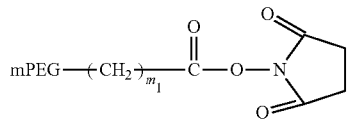

wherein 0≤m1≤6, and m1 is preferably 5; mPEG represents a monomethoxy terminated polyethylene glycol group; and the molecular weight of the modifier in formula (1) is between 5 to 60 kDa;

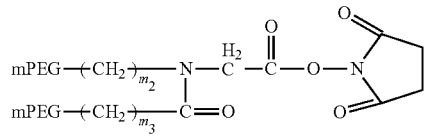

wherein 0≤m2≤6, and m2 is preferably 2; 0≤m3≤6, and m3 is preferably 1; mPEG represents a monomethoxy terminated polyethylene glycol group; and the molecular weight of the modifier in formula (2) is between 5 to 100 kDa, preferably 40 kDa, 50 kDa, 60 kDa, more preferably 40 kDa;

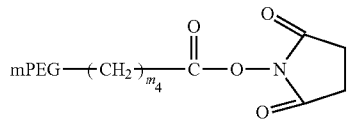

wherein, 0≤m4≤6, and m4 is preferably 2; mPEG represents a monomethoxy-terminated polyethylene glycol group; and the molecular weight of the modifier in formula (3) is between 5 to 100 kDa.

17. The method according to some embodiments, wherein the coagulation factor VIII is linked to the fusion partner via a peptide linker, and the peptide linker includes a flexible peptide segment and/or a rigid peptide segment, for example including 1, 2, 3, 4, 5 or more of the rigid peptide segments.

18. The method according to an embodiment, wherein the flexible peptide segment comprises 2 or more amino acid residues selected from glycine, serine, alanine and threonine,
  preferably, the flexible peptide segment has a general formula $(GS)_a(GGS)_b(GGGS)_c(GGGGS)_d$, wherein a, b, c and d are integers greater than or equal to 0, and a+b+c+d≥1,
  more preferably, the flexible peptide segment has a sequence selected from the group consisting of:

(i)
```
                                            (SEQ ID NO: 6)
GSGGGSGGGGSGGGGS;
```

(ii)
```
                                            (SEQ ID NO: 7)
GSGGGGSGGGGSGGGGSGGGGSGGGGS;
```

(iii)
```
                                            (SEQ ID NO: 8)
GGGGSGGGGSGGGGSGGGGS;
```

-continued (iv)
(SEQ ID NO: 9)
GSGGGGSGGGGSGGGGSGGGGSGGGGSGGGGSGGGGS;
and (v)
(SEQ ID NO: 10)
GGGSGGGSGGGSGGGSGGGS.

19. The polyalkylene glycol-conjugated coagulation factor VIII fusion protein according to some embodiments, wherein the rigid peptide segment is the carboxy terminal peptide of human chorionic gonadotropin β subunit, or the rigid peptide segment has at least 70%, 80%, 90%, 95% or higher identity to the carboxy terminal peptide of human chorionic gonadotropin β subunit; the rigid peptide segment may comprises 1, 2 or more glycosylation sites;

preferably, the rigid peptide segment comprises an amino acid sequence selected from:

(i)
(SEQ ID NO: 11)
PRFQDSSSSKAPPPSLPSPSRLPGPSDTPILPQ;

(ii)
(SEQ ID NO: 12)
SSSSKAPPPSLPSPSRLPGPSDTPILPQ;

(iii)
(SEQ ID NO: 13)
SSSSKAPPPS;
and (iv)
(SEQ ID NO: 14)
SRLPGPSDTPILPQ;

more preferably, the peptide linker comprises the amino acid sequence shown in SEQ ID NO: 15.

BRIEF DESCRIPTION OF DRAWINGS

In order to explain the embodiments of the present disclosure and the technical solutions of the prior art more clearly, the following briefly introduces the drawings that need to be used in the embodiments and the prior art. Obviously, the drawings in the following description only represent some embodiments of the present disclosure. For those of ordinary skill in the art, other embodiments can be obtained based on these drawings without creative work.

DETAILED DESCRIPTION

Figure 1A:
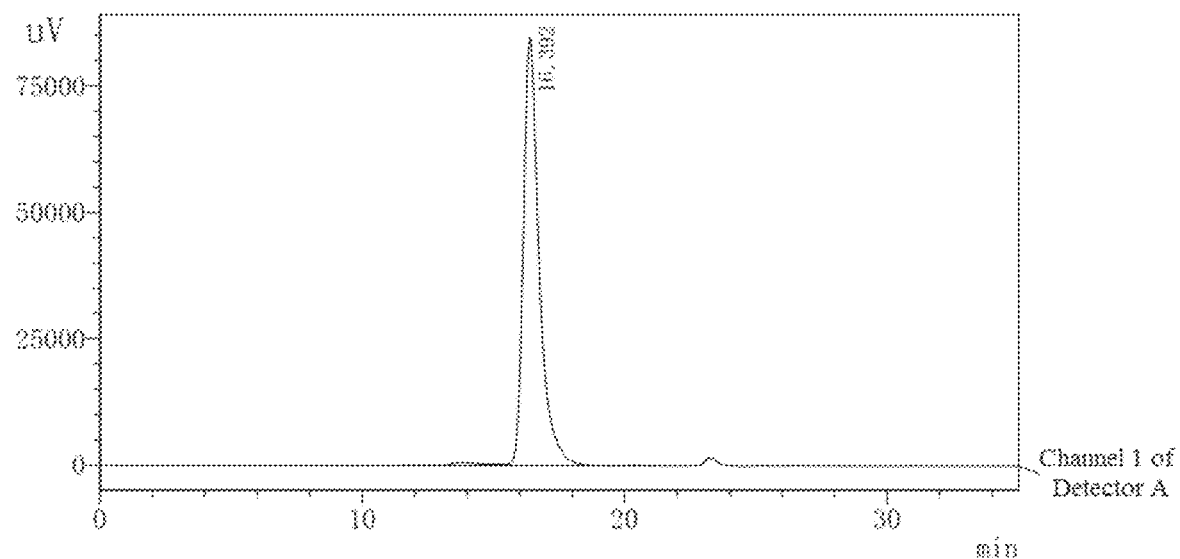
FIG. 1A shows the results of SEC-HPLC detection of FVIII-Fc (FF-0) without mPEG modification.
Figure 1B:
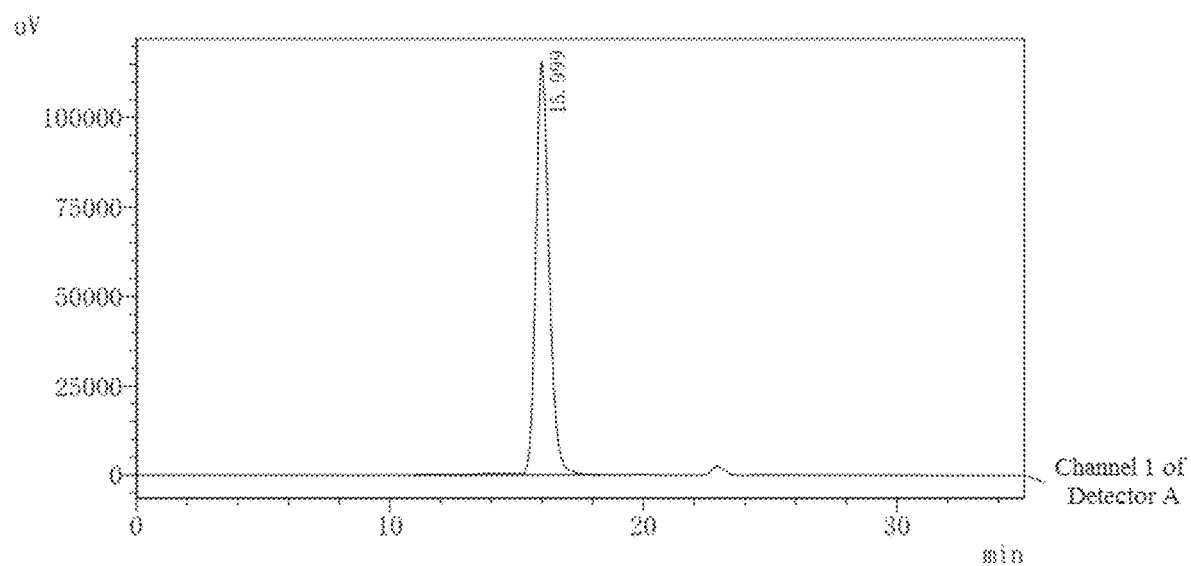
FIG. 1B shows the results of SEC-HPLC detection of FVIII-Fc modified with mPEG of 5 kDa molecular weight (FF-5L).
Figure 1C:
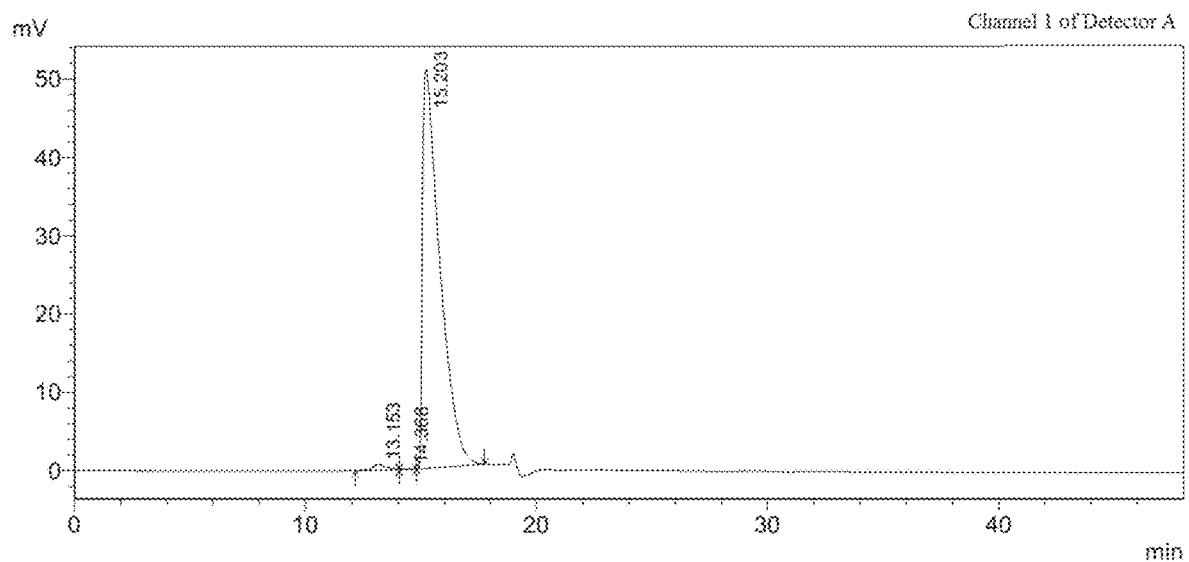
FIG. 1C shows the results of SEC-HPLC detection of FVIII-Fc modified with mPEG of 10 kDa molecular weight (FF-10L).
Figure 1D:
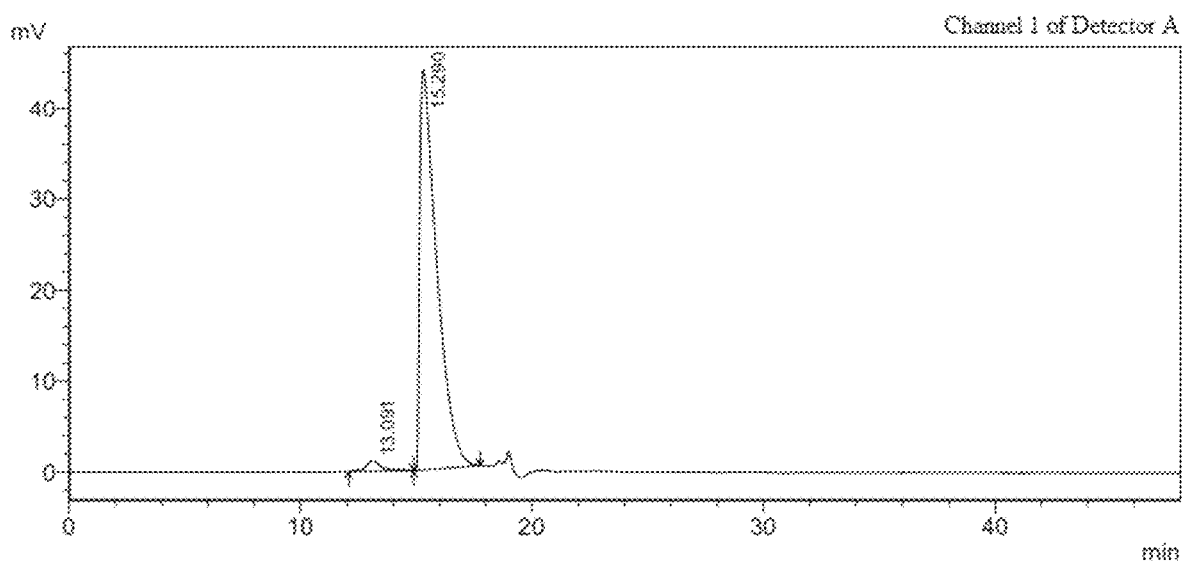
FIG. 1D shows the results of SEC-HPLC detection of FVIII-Fc modified with mPEG of 20 kDa molecular weight (FF-20L).
Figure 1E:
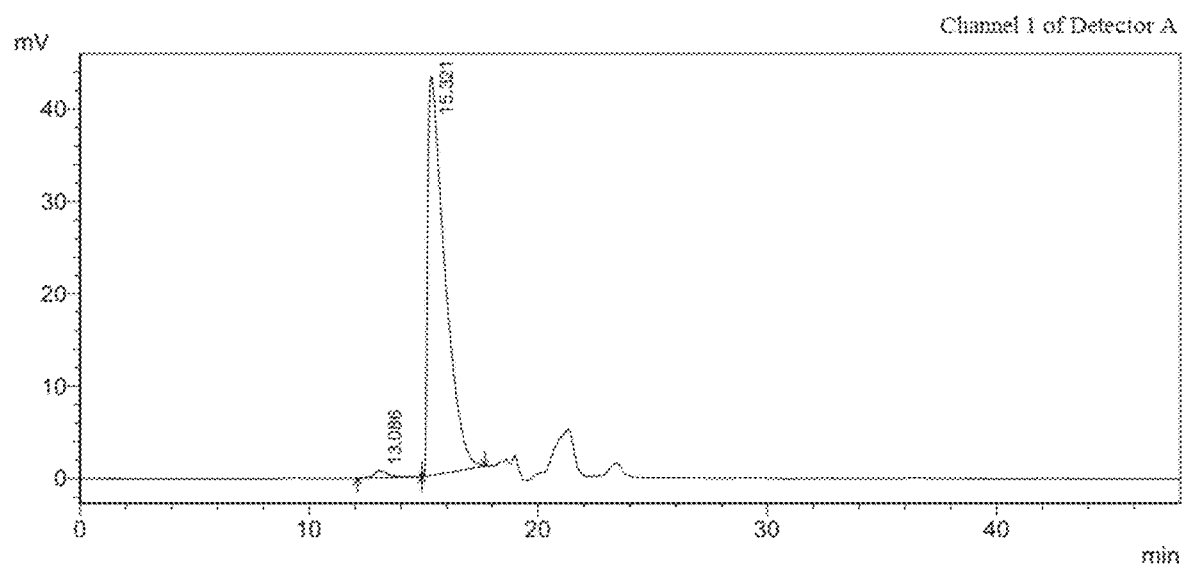
FIG. 1E shows the results of SEC-HPLC detection of FVIII-Fc modified with mPEG of 30 kDa molecular weight (FF-30L).
Figure 1F:
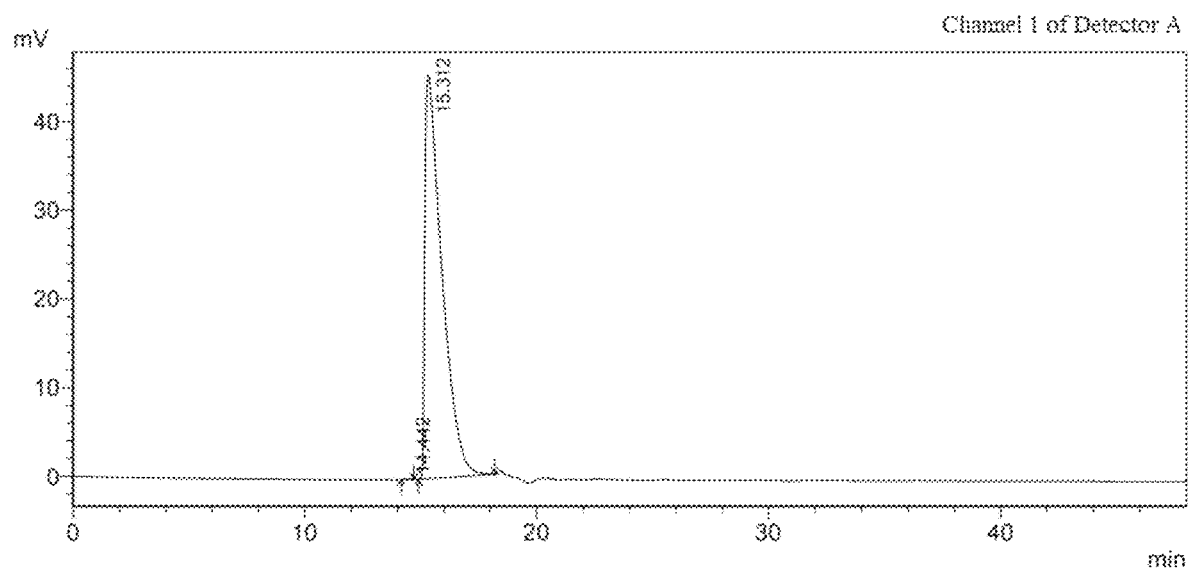
FIG. 1F shows the results of SEC-HPLC detection of FVIII-Fc modified with mPEG of 40 kDa molecular weight (FF-40L).
Figure 2A:
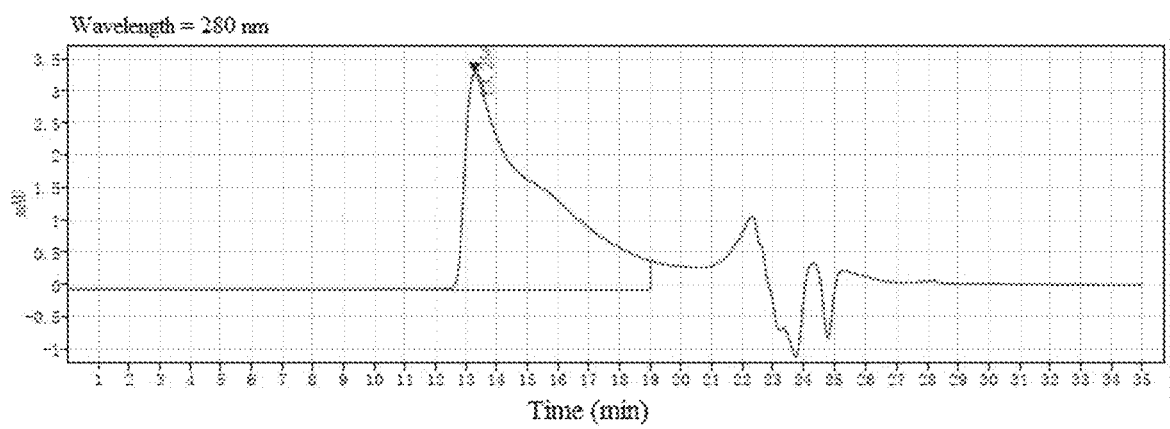
FIG. 2A shows the results of SEC-HPLC detection of FVIII-Linker1-Fc (FL1F-0) without mPEG modification (purity>99%, aggregate<1%).
Figure 2B:
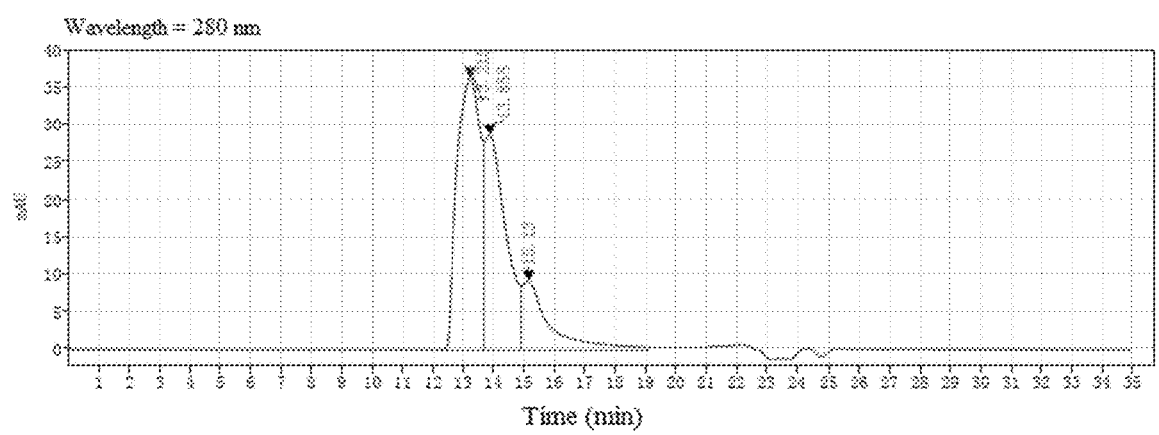
FIG. 2B shows the results of SEC-HPLC detections of FVIII-L1-Fc modified with mPEG of 20 kDa molecular weight (FL1F-20L) (purity>95%, aggregate<5%, uncrosslinked <1%).
Figure 2C:
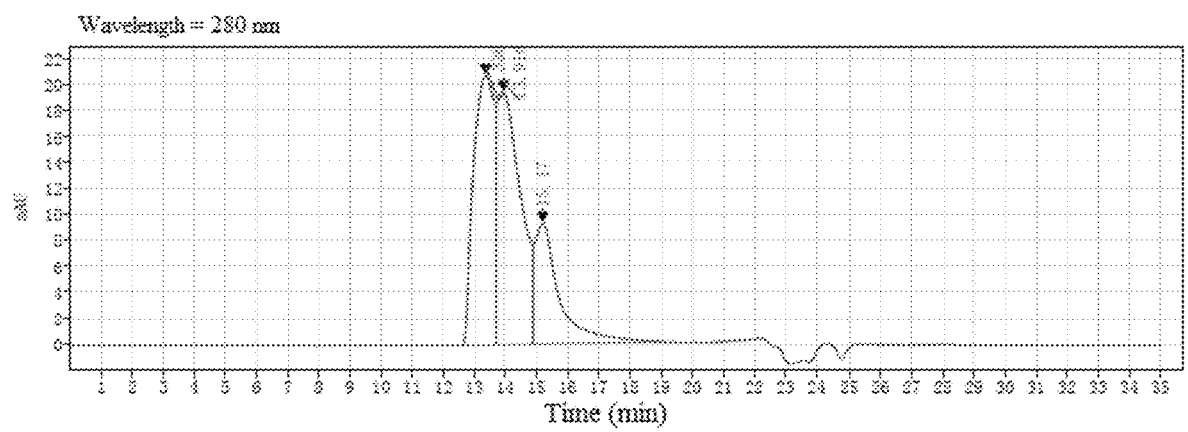
FIG. 2C shows the results of SEC-HPLC detections of FVIII-L1-Fc modified with linear, 30 kDa mPEG (FL1F-30L) (purity>95%, aggregate<5%, uncrosslinked <1%).
Figure 2D:
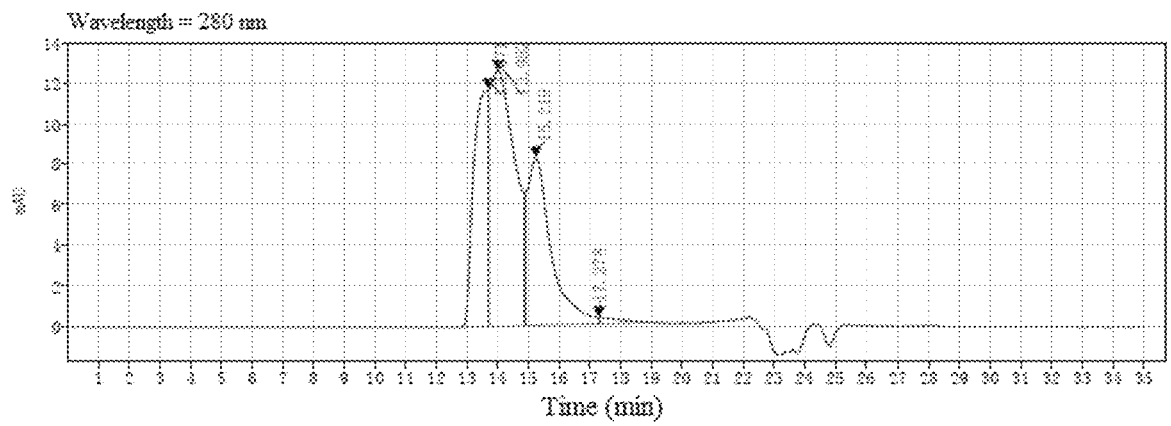
FIG. 2D shows the results of SEC-HPLC detection of FVIII-L1-Fc modified with linear, 40 kDa mPEG (FL1F-40L) (purity>95%, aggregate<5%, uncrosslinked <1%).
Figure 2E:
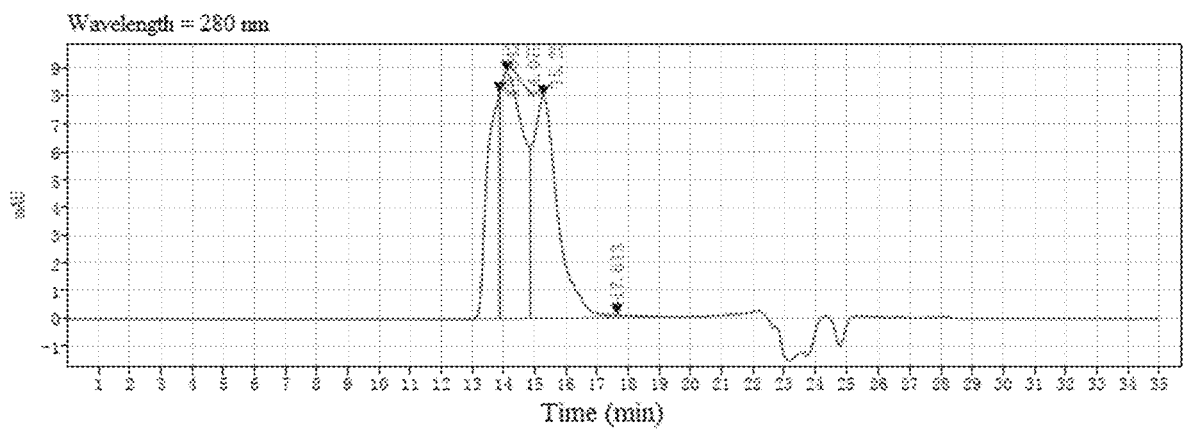
FIG. 2E shows the results of SEC-HPLC detection of FVIII-L1-Fc modified with linear, 50 kDa mPEG (FL1F-50L) (purity>95%, aggregate<5%, uncrosslinked <1%).
Figure 2F:
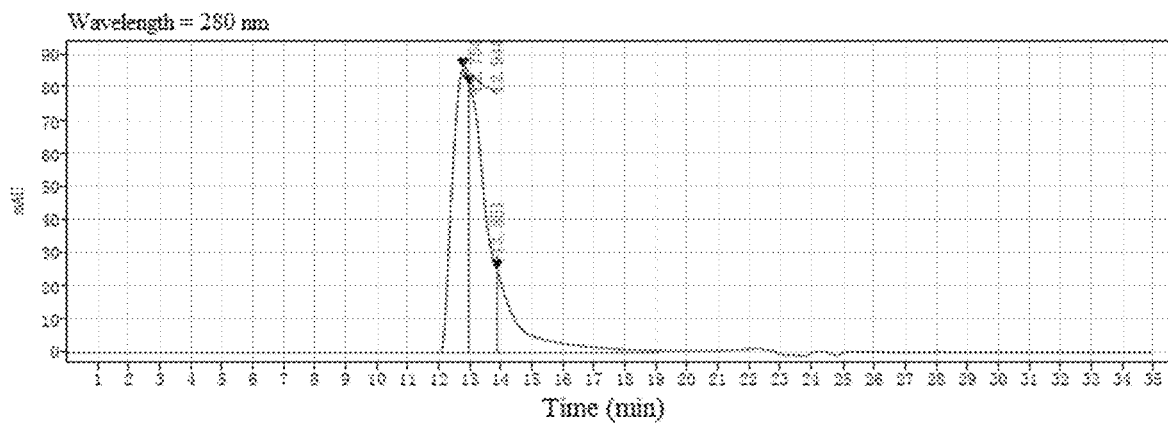
FIG. 2F shows the results of SEC-HPLC detections of FVIII-L1-Fc modified with Y-shaped 40 kDa mPEG (FL1F-40Y) (purity>95%, aggregate<5%, uncrosslinked <1%).

In order to make the objectives, technical solutions, and advantages of the present disclosure clearer, the following further describes the present disclosure in detail with reference to the drawings and embodiments. Obviously, the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

The term "coagulation factor VIII", also called factor VIII, or FVIII, refers to a large and complex glycoprotein mainly produced by liver cells. The term "coagulation factor VIII active moiety" refers to a moiety of the fusion protein of the present disclosure that exhibits FVIII activity. Natural human FVIII consists of 2351 amino acids, including signal peptide, as well as several different domains defined by homology: three A domains, one B domain and two C domains in the order of NH2-A1-A2-B-A3-C1-C2-COOH. In the blood, FVIII is secreted as a heterodimer consisting of two chains (cleaved at the boundary of B-A3), which are linked by divalent metal ions. The A1-A2-B chain is called the heavy chain (HC), and the A3-C1-C2 chain is called the light chain (LC).

The endogenous Factor VIII molecules circulate in the body as a pool of molecules with B domains of different sizes. The gradual enzymatic cleavage of B domain may occur in vivo, resulting in a pool of molecular with B domains of different sizes. It is generally believed that the occurrence of the cleavage at position 740 (the last part of the B domain is excised here) is related to the activation of thrombin.

The "coagulation factor VIII" in the present disclosure may refer to the natural wild-type sequence (such as SEQ ID NO: 1), and also its variants, for example, a variant protein obtained by substitutions, deletions or insertions of one or more amino acids, while retaining the activity of coagulation factor VIII.

In an embodiment, coagulation factor VIII is a B-domain deleted molecule, wherein the remaining domains substantially correspond to amino acids 1-745 and 1640-2332 in SEQ ID NO:1. In addition, the B-domain deleted molecule of the present disclosure may have slight differences from the sequence shown in SEQ ID NO: 2, that is, the remaining domains (i.e., three A domains and two C domains) may have substitutions, additions or deletions of one or more amino acids based on the amino acid sequence shown in SEQ ID NO: 2, for example have 1, 2, 3, 4, 5, 6, 7, 8, 9, 10 or more amino acid differences or about 1%, 2%, 3%, 4% or 5% difference from the sequence shown in SEQ ID NO: 2. Such differences may change the binding ability of factor VIII to various other components (such as LRP, multiple receptors, other coagulation factors, cell surface), or introduce and/or eliminate glycosyl groups, while retaining the basic activity of factor VIII.

The term "fusion partner" refers to a polypeptide that is fused with the target polypeptide (a polypeptide whose half-life is desired to be extended). The fusion partner can change the properties of the fusion protein through a variety of different mechanisms, such as extending the half-life of the target polypeptide in vivo.

In an embodiment, the fusion partner delays the in vivo clearance of FVIII by interacting with the neonatal Fc receptor (FcRn). In an embodiment, the fusion partner is an immunoglobulin Fc region (Fc region), albumin, transferrin,)(TEN, or a portion thereof. In a preferred embodiment, the IgG Fc is preferred due to its relatively long half-life.

The Fc domain can also be modified to change its functions, such as complement binding and/or binding to certain Fc receptors. Mutations at positions 234, 235, and 237 in the IgG Fc domain usually result in reduced binding to FcγRI receptors, and may also lead to reduced binding to FcγRIIa and FcγRIII receptors. Such mutations do not change the binding to the FcRn receptor, which promotes a long circulation half-life through the endocytosis and recirculation pathway. Preferably, the modified IgG Fc domain of the fusion protein in the present disclosure contains one or more of such mutations, some mutations (L234A, L235E, and G237A) lead to decreased affinity for certain Fc receptors, and others (A330S and P331S) lead to decreased C1q-mediated complement binding.

The term "polyalkylene glycol" is a hydrophilic polymer that is conjugated at a specific position on the coagulation factor VIII and/or fusion partner in the present disclosure. The polyalkylene glycol may be linear or branched, and may contain one or more independently selected polymeric moieties. Preferably, the polyalkylene glycol is polyethylene glycol (including its methoxy-terminated form, m-PEG), polypropylene glycol (including mPPG), etc.

The polyalkylene glycol in the present disclosure may be polyethylene glycol (PEG), and may be linear or branched. The backbone of a branched polymer is well-known in the art. Generally, the branched polymer has a central branched core portion and one or more linear polymer chains connected to the central branched core. The present disclosure preferably uses branched form of PEG. In an embodiment, the branched polyethylene glycol can be represented by the general formula R(-PEG-OH)$_m$, where R represents the core part, such as glycerol or pentaerythritol, and m represents the number of arms/branches.

In an embodiment, the number of branches in a branched PEG (such as mPEG) is 2, so it is also called "Y-type" PEG (such as mPEG), that is, a branched PEG containing two PEGs or a branched PEG containing linear methoxy PEG.

Examples of other suitable polymers include, but are not limited to, other polyalkylene glycols (e.g., polypropylene glycol (PPG), copolymers of ethylene glycol and propylene glycol), polyoxyethylated polyols, olefinic alcohol, polyvinylpyrrolidone, polyhydroxypropylmethacrylamide, poly ([α]-hydroxy acid), polyvinyl alcohol, polyphosphazene, polyoxazoline, polyN-acryloylmorpholine and copolymers, terpolymers and mixtures thereof.

In an embodiment of the present disclosure, PEG modification (i.e., conjugation), and more preferably mPEG modification is used, wherein the modification is at a random or specific position, and the modification position is selected from the group consisting of a free amino group, sulfhydryl group, sugar group and/or carboxyl group, preferably free amino group.

In a specific embodiment of the present disclosure, the modifier, that is, polyalkylene glycol or a modified polyalkylene glycol in this specification, used for random modification at free amino group can be selected from mPEG-SS (methoxy polyethylene glycol-succinimidyl succinate), mPEG-SC (methoxy polyethylene glycol-succinimidyl carbonate), mPEG-SPA (methoxy polyethylene glycol-succinimidyl propionate) and mPEG-SG (methoxy polyethylene glycol-succinimidyl glutarate) and so on. For N-terminal modification, one of mPEG-ALD (methoxy polyethylene glycol-acetaldehyde), mPEG-pALD (methoxy polyethylene glycol-propionaldehyde) and mPEG-bALD (methoxy polyethylene glycol-butyraldehyde) and so on is selected. The modifiers mPEG-SS, mPEG-SC, mPEG-SPA, mPEG-SG, mPEG-ALD, mPEG-pALD, mPEG-bALD are linear or branched.

In a specific embodiment of the present disclosure, the modifier used for random modification at free sulfhydryl groups are mPEG-mal (methoxy polyethylene glycol-maleimide), mPEG-OPSS (methoxy polyethylene glycol-Orthopyridyl Disulfide), mPEG-Vinylsulfone (methoxypolyethylene glycol-vinylsulfone) and mPEG-Thiol (methoxypolyethylene glycol-thiol), etc.

In a specific embodiment of the present disclosure, the modifier used for random modification at the sugar group and/or carboxyl group is mPEG-ZH (methoxy polyethylene glycol-hydrazide).

In an embodiment of the present disclosure, the modifier for modification has the structure shown in formula (1):

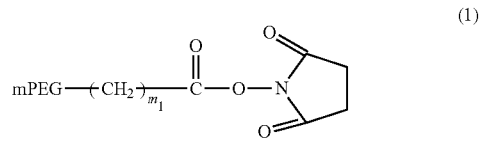

(1)

wherein 0≤m1≤6, and m1 is preferably 5; and mPEG represents a monomethoxy terminated polyethylene glycol group. The modifier represented by formula (1) has a molecular weight of 5-60 kDa (kDa, kilodaltons), preferably 40 kDa. Preferably, in an embodiment of the present disclosure, the modifier represented by formula (1) is used for a random mPEG modification at free amino group.

In an embodiment of the present disclosure, the modifier for modification has the structure shown in formula (2):

$$\text{mPEG}-(\text{CH}_2)_{m_2}-\overset{H_2}{\text{N}}-\overset{|}{\text{C}}-\overset{O}{\overset{\|}{\text{C}}}-O-N\overset{O}{\underset{O}{\diagdown}} \qquad (2)$$
$$\text{mPEG}-(\text{CH}_2)_{m_3}-\text{C}=\text{O}$$

wherein 0≤m2≤6, and m2 is preferably 2; 0≤m3≤6, and m3 is preferably 1; and mPEG represents a monomethoxy terminated polyethylene glycol group. The modifier represented by formula (2) has a molecular weight of 5-60 kDa, preferably 40 kDa. Preferably, in an embodiment of the present disclosure, the modifier represented by formula (2) is used for a random mPEG modification at free amino group.

In an embodiment of the present disclosure, the modifier for modification has the structure shown in formula (3):

$$\text{mPEG}-(\text{CH}_2)_{m_4}-\overset{O}{\overset{\|}{\text{C}}}-O-N\overset{O}{\underset{O}{\diagdown}} \qquad (3)$$

wherein, 0≤m4≤6, and m4 is preferably 2; and mPEG represents a monomethoxy-terminated polyethylene glycol group. The modifier represented by formula (3) has a molecular weight of 5-60 kDa, preferably 40 kDa. Preferably, in an embodiment of the present disclosure, the modifier represented by formula (3) is used for a random mPEG modification at free sulfhydryl group.

The size of the polymer backbone may vary, but the typical size range of polymers (such as PEG, mPEG, PPG, or mPPG) is about 0.5 kDa to about 160 kDa, for example, about 1 kDa to about 100 kDa. More specifically, the size of each hydrophilic polymer conjugated in the present disclosure mainly varies within the following ranges: about 1 kDa to about 80 kDa, about 2 kDa to about 70 kDa; about 5 kDa to about 70 kDa; about 10 kDa to about 60 kDa, about 20 kDa to about 50 kDa; about 30 kDa to about 50 kDa or about 30 kDa to about 40 kDa. It should be understood that these sizes represent approximate values, not precise measurements, as recognized in the art.

In a specific embodiment, the size of PEG or mPEG used in the present disclosure is above 35 kDa (i.e. not less than 35 kDa), preferably not less than 40 kDa, not less than 45 kDa, not less than 50 kDa, not less than 55 kDa, not less than 60 kDa, not less than 65 kDa or not less than 70 kDa, for example, the molecular weight is specifically 40 kDa, 50 kDa, 60 kDa, 70 kDa, 80 kDa, 90 kDa, 100 kDa, 110 kDa, 120 kDa, 130 kDa, 140 kDa, 150 kDa or 160 kDa.

The term "improved circulation half-life" means that the molecules of the present disclosure have an altered circulation half-life (plasma half-life), preferably an increased circulation half-life compared with wild-type factor VIII. The circulation half-life is preferably increased by at least 10%, preferably at least 15%, preferably at least 20%, preferably at least 25%, preferably at least 30%, preferably at least 35%, preferably at least 40%, preferably at least 45%, preferably at least 50%, preferably at least 55%, preferably at least 60%, preferably at least 65%, preferably at least 70%, preferably at least 75%, preferably at least 80%, preferably at least 85%, preferably at least 90%, preferably at least 95%, preferably at least 100%, more preferably at least 125%, more preferably at least 150%, more preferably at least 175%, more preferably at least 200%, and most preferably at least 250% or 300%. Even more preferably, the molecule has a circulation half-life increased by at least 400%, 500%, 600%, or even 700%.

The term "pharmaceutically acceptable carrier" includes, but is not limited to: saline, buffer, glucose, water, glycerol, ethanol, and combinations thereof. Generally, the pharmaceutical preparation should be suitable for the mode of administration. The pharmaceutical composition of the present disclosure can be made into an injection form, for example, by conventional methods with physiological saline or an aqueous solution containing glucose and other adjuvants. The pharmaceutical composition should be manufactured under aseptic conditions. The amount of active ingredient administered is a therapeutically effective amount. The pharmaceutical preparation of the invention can also be made into a sustained-release preparation.

EXAMPLES

Example 1

Preparation and Purification of mPEG-Modified hFVIII Fusion Protein 1.1. Preparation of mPEG-Modified hFVIII Fusion Protein
1.1.1 A series of hFVIII fusion protein expression plasmids were constructed according to the molecular cloning technology well known to those skilled in the art, and the expression plasmids were respectively transfected into DHFR-deficient CHO cells (see U.S. Pat. No. 4,818,679) to express each hFVIII fusion protein (Table 1). For the specific preparation steps of the fusion protein, see Chinese Patent ZL201610692838.0, which is incorporated herein by reference in its entirety.

TABLE 1

Composition and structure of fusion protein

| Name and abbreviation of hFVIII fusion protein | hFVIII part | Fusion partner | Linker |
|---|---|---|---|
| hFVIII-Fc (FF-0) | B-domain deleted hFVIII* (SEQ ID NO: 2) | Fc fragment of natural human IgG2 | None |
| hFVIII-L1-Fc (FL1F-0) | B-domain deleted hFVIII (SEQ ID NO: 2) | SEQ ID NO: 3 | SEQ ID NO: 7-SEQ ID NO: 12** |
| hFVIII-L2-Fc (FL2F-0) | B-domain deleted hFVIII (SEQ ID NO: 2) | SEQ ID NO: 3 | SEQ ID NO: 6-SEQ ID NO: 11** |
| hFVIII(full-length)-L1-Fc', F(full-length)L1F'-0 | Full-length hFVIII (SEQ ID NO: 1) | SEQ ID NO: 4 | SEQ ID NO: 7-SEQ ID NO: 12 |

TABLE 1-continued

Composition and structure of fusion protein

| Name and abbreviation of hFVIII fusion protein | hFVIII part | Fusion partner | Linker |
|---|---|---|---|
| hFVIII(full-length)-L2-Fc", F(full-length)L2F'''-0 | Full-length hFVIII (SEQ ID NO: 1) | SEQ ID NO: 5 | SEQ ID NO: 7-SEQ ID NO: 12 |

Note:
*B-domain deleted hFVIII is abbreviated as BDD FVIII, which consists of a 90 kD A1-A2 heavy chain and a 80 kD light chain.
**SEQ ID NO: 7-SEQ ID NO: 12 means that the linker is formed by connecting the rigid peptide segment shown in SEQ ID NO: 12 to the C-terminus of the flexible peptide segment shown in SEQ ID NO: 7; and SEQ ID NO: 6-SEQ ID NO: 11 means that the linker is formed by connecting the rigid peptide segment shown in SEQ ID NO: 11 to the C-terminus of the flexible peptide segment shown in SEQ ID NO: 6.

1.1.2. The fermentation broth of each fusion protein in 1.1.1 was centrifuged, filtered, and then subjected to affinity chromatography/hydrophobic interaction chromatography/ion-exchange chromatography/size exclusion chromatography to obtain five hFVIII fusion proteins FF-0, FL1F-0, FL2F-0, F(full-length)L1F'-0 and F(full-length)L2F'''-0, for which, SEC-HPLC detection shown that the aggregate was less than 5%. Five hFVIII fusion proteins were respectively formulated to hFVIII fusion protein stock solutions with a protein concentration of 0.95 mg/ml.

1.1.3. 5 ml of each of the five hFVIII fusion protein stock solutions prepared in 1.1.2 was subjected to G25 (GE Healthcare) molecular sieve chromatography. Specific process was as follows.

Buffer preparation: 20 mM Hepes, 0.1M NaCl, 5.0 mM CaCl$_2$), 0.02% Tween8.0, pH 7.0;

Chromatography (1) Equilibrium: the chromatography column was equilibrated with 3 times the column volume of Binding Buffer, until the pH and conductivity were the same as those of the buffer, and the flow rate was stable at 150 cm/h.

(2) Sample loading: the flow rate was controlled at 150 cm/h.

(3) Equilibrium: the chromatography column was equilibrated with 3 times the column volume of buffer, until the pH and conductivity were the same as those of the buffer, and the flow rate was stable at 150 cm/h.

(4) Equilibrium: the chromatography column was equilibrated with buffer, and peaks with A280/A260 greater than 1.8 were collected.

(5) In situ cleaning of the chromatography column: the column was cleaned reversely with 1.5 times the column volume of 0.2M NaOH at a flow rate of 60 cm/h, and neutralized with buffer;

(6) Storage of the chromatographic column: after the experiment, the column was cleaned with 3 times the column volume of purified water at a flow rate of 100 cm/h, and then was stored with 2 times the column volume of 20% ethanol.

Ultrafiltration concentration: five hFVIII fusion proteins (FF-0, FL1F-0, FL2F-0, F(full-length)L1F'-0 and F(full-length)L1F'''-0) stock solutions after G25 exchange were concentrated by ultrafiltration with a 50 kDa ultrafiltration filter tube, and concentrated by centrifugation at 3,800 rpm, 4° C., to a protein concentration of preferably 1.5 mg/ml.

1.1.4. Desired mPEG-SC (linear L-shaped mPEG-SC with the structure shown in formula (1) with a molecular weight of 5 kDa, 10 kDa, 20 kDa, or 30 kDa, 40 kDa, respectively, and branched Y-shaped mPEG-SC with the structure shown in formula (2) with a molecular weight of 40 kDa) (Beijing jenkem Technology Co., Ltd.) was weighted according to the molar ratio of hFVIII fusion protein to mPEG-SC of 1:10-1:100. It was added to the concentrated hFVIII fusion protein after ultrafiltration in 1.1.3 and allowed to react for 4 hours. Then, histidine in a 10 times molar ratio to the substrate hFVIII fusion protein was added to terminate the reaction, to obtain mPEG-SC modified hFVIII fusion protein with different molecular weights. The number and composition of some modified products are shown in Table 2 below.

TABLE 2

| Name/Abbreviation | Molecular weight and shape of mPEG-SC | Fusion protein part |
|---|---|---|
| FF-0 | Unmodified | hFVIII-Fc |
| FF-5L | 5 kDa, liner | hFVIII-Fc |
| FF-10L | 10 kDa, liner | hFVIII-Fc |
| FF-20L | 20 kDa, liner | hFVIII-Fc |
| FF-30L | 30 kDa, liner | hFVIII-Fc |
| FF-40L | 40 kDa, liner | hFVIII-Fc |
| FL1F-0 | Unmodified | hFVIII-L1-Fc |
| FL1F-10L | 10 kDa, liner | hFVIII-L1-Fc |
| FL1F-20L | 20 kDa, liner | hFVIII-L1-Fc |
| FL1F-30L | 30 kDa, liner | hFVIII-L1-Fc |
| FL1F-30Y | 30 kDa, Y-shaped | hFVIII-L1-Fc |
| FL1F-40L | 40 kDa, liner | hFVIII-L1-Fc |
| FL1F-40Y | 40 kDa, Y-shaped | hFVIII-L1-Fc |
| FL1F-50L | 50 kDa, liner | hFVIII-L1-Fc |
| FL1F-60L | 60 kDa, liner | hFVIII-L1-Fc |
| FL2F-0 | Unmodified | hFVIII-L2-Fc |
| FL2F-10L | 10 kDa, liner | hFVIII-L2-Fc |
| FL2F-20L | 20 kDa, liner | hFVIII-L2-Fc |
| FL2F-30L | 30 kDa, liner | hFVIII-L2-Fc |
| FL2F-30Y | 30 kDa, Y-shaped | hFVIII-L2-Fc |
| FL2F-40L | 40 kDa, liner | hFVIII-L2-Fc |

TABLE 2-continued

| Name/Abbreviation | Molecular weight and shape of mPEG-SC | Fusion protein part |
|---|---|---|
| FL2F-40Y | 40 kDa, Y-shaped | hFVIII-L2-Fc |
| FL2F-50L | 50 kDa, liner | hFVIII-L2-Fc |
| FL2F-60L | 60 kDa, liner | hFVIII-L2-Fc |
| F(full-length)L1F'-0 | Unmodified | hFVIII(full-length)-L1-Fc' |
| F(full-length)L1F'-40L | 40 kDa, liner | hFVIII(full-length)-L1-Fc' |
| F(full-length)L1F'-40Y | 40 kDa, Y-shaped | hFVIII(full-length)-L1-Fc' |
| F(full-length)L1F'-50L | 50 kDa, liner | hFVIII(full-length)-L1-Fc' |
| F(full-length)L2F"-0 | Unmodified | hFVIII(full-length)-L2-Fc" |
| F(full-length)L2F"-40L | 40 kDa, liner | hFVIII(full-length)-L2-Fc" |
| F(full-length)L2F"-40Y | 40 kDa, Y-shaped | hFVIII(full-length)-L2-Fc" |
| F(full-length)L2F"-50L | 50 kDa, liner | hFVIII(full-length)-L2-Fc" |

1.2 Purification of mPEG-Modified hFVIII Fusion Protein 1.2.1. Each mPEG-modified hFVIII fusion protein prepared in 1.1.4. of Example 1 was subjected to S200 (GE Healthcare) molecular sieve chromatography, respectively. Specific process was as follows.

Buffer preparation: 20 mM histidine, 0.1M NaCl, 5.0 mM CaCl$_2$), 0.02% Tween8.0, pH 7.0

Chromatography (1) Equilibrium: the chromatography column was equilibrated with 3 column volume of Binding Buffer, until the pH and conductivity were the same as those of the buffer, and the flow rate was controlled at 150 cm/h.

(2) Sample loading: the sample flow rate is controlled at 150 cm/h.

(3) Equilibrium: the chromatography column was equilibrated with 3 times the column volume of buffer, until the pH and conductivity were the same as those of the buffer, and the flow rate was controlled at 150 cm/h.

(4) Equilibrium: the chromatography column was equilibrated with buffer, and peaks with A280/A260 greater than 1.8 were collected.

(5) In situ cleaning of the chromatography column: the column was cleaned reversely with 1.5 times the column volume of 0.2M NaOH at a flow rate of 60 cm/h, and neutralized with buffer.

(6) Storage of the chromatographic column: after the experiment, the column was cleaned with 3 times the column volume of purified water at a flow rate of 100 cm/h, and then was stored with 2 times the column volume of 20% ethanol.

1.2.2. The chromatographic products obtained in 1.2.1. were subjected to Source 15Q (GE Healthcare) anion chromatography.

Buffer Preparation

Binding buffer: 20 mM histidine, 0.1M NaCl, 5.0 mM CaCl$_2$), 0.02% Tween8.0, pH 7.0; elution buffer: 20 mM histidine, 2.0M NaCl, 5.0 mM CaCl$_2$), 0.02% Tween 8.0, pH 7.0; CIP: 0.5M NaOH.

Chromatography (1) Equilibrium: the chromatography column was equilibrated with 3 column volume of Binding Buffer, until the pH and conductivity were the same as those of the buffer, and the flow rate was controlled at 150 cm/h.

(2) Sample loading: the flow rate was uniformly 150 cm/h.

(3) Equilibrium: the chromatography column was equilibrated with 3 times the column volume of binding buffer, until the pH and conductivity were the same as those of the buffer, and the flow rate was controlled at 150 cm/h.

(4) Elution: The sample was eluted with 20 times the column volume of buffer B in 0-100% linear gradient, in a uniform flow rate of 100 cm/h. The elution peaks with A280/A260 greater than 1.8 were collected in separate tubes and subjected to SEC-HPLC detection.

(5) In situ cleaning of the chromatography column: the column was cleaned reversely with 1.5 times the column volume of 0.5M NaOH at a flow rate of 60 cm/h, and neutralized with binding buffer.

(6) Storage of the chromatographic column: after the experiment, the column was cleaned with 3 times the column volume of purified water at a flow rate of 100 cm/h, and then was stored with 2 times the column volume of 20% ethanol.

1.2.3. SEC-HPLC Detection

The chromatographic products obtained in 1.2.2. were subjected to SEC-HPLC detection.

Column: G3000/G4000; Flow rate: 0.5 mL/min; Detection wavelength: 280 nm; Column temperature: 25° C.; Injection volume: 100 μL (injection amount: 20 μg); Mobile phase: 0.30M sodium chloride, 0.02M imidazole, 0.01M calcium chloride, 25 ppm Tween 80, 10% ethanol, pH 7.0; Running time: 35-50 min.

The detection results of FF-0 to FF-40L are shown in FIG. 1A-1F. The detection results of FL1F-0 to FL1F-50L and FL1F-40Y are shown in FIG. 2A-2F. These results show that, for FL1F-0 to FL1F-60L, the purity is >95%, the polymer is <5%, and the uncrosslinked <1%.

1.2.4. SDS-PAGE Gel Electrophoresis Detection

The products obtained in 1.2.2. were subjected to SDS-PAGE detection.

(1) Gel preparation. 1×Tris-glycine electrophoresis buffer: SDS 0.4 g, Tris base 1.21 g, glycine 7.5 g, and double-distilled water to make up to 400 mL.

5% stacking gel: double-distilled water 4.1 mL, 1M Tris-HCl (pH 6.8) 0.75 mL, 30% (w/v) polyacrylamide 1 mL, 10% (w/v) ammonium persulfate 60 μL, 10% (w/v) SDS 60 μL, TEMED 6 μL.

6% separating gel: double-distilled water 4.9 mL, 1.5M Tris-HCl (pH 8.8) 3.8 mL, 30% (w/v) polyacrylamide 6 mL, 10% (w/v) ammonium persulfate 150 μL, 10% (w/v) SDS 150 μL, TEMED 6 μL.

(2) 5×protein loading buffer: glycerol 5 mL, 1M Tris-HCl (pH 6.8) 2.5 mL, bromophenol blue 0.05 g, SDS 1 g, double-distilled water to make up to 10 mL, stored at 4° C., and β-mercaptoethanol 0.5 mL was added before use.

(3) Sample preparation: the sample to be tested was mixed with an equal volume of loading buffer. For reducing SDS-PAGE, 0.1 mg/mL 2-mercaptoethanol was added in the same volume as the sample, and for non-reducing SDS-PAGE, no 2-mercaptoethanol was added. After the sample was mixed with the loading buffer, it was heated in boiling water for 10 minutes.

(4) Electrophoresis: 10 μl of the sample to be tested and the protein marker were loaded into the wells of the gel respectively, and subjected to electrophoresis at a voltage of 60V. After bromophenol blue dye entered the separating gel, the voltage was increased to 120 V, until bromophenol blue dye reached the bottom of the separating gel, then the power was turned off.

(5) Staining: the SDS-PAGE gel was carefully removed and placed in a plastic box containing Coomassie Brilliant Blue staining solution, and then the box was placed in a microwave oven to heat for 1 minute.

Figure 3A:
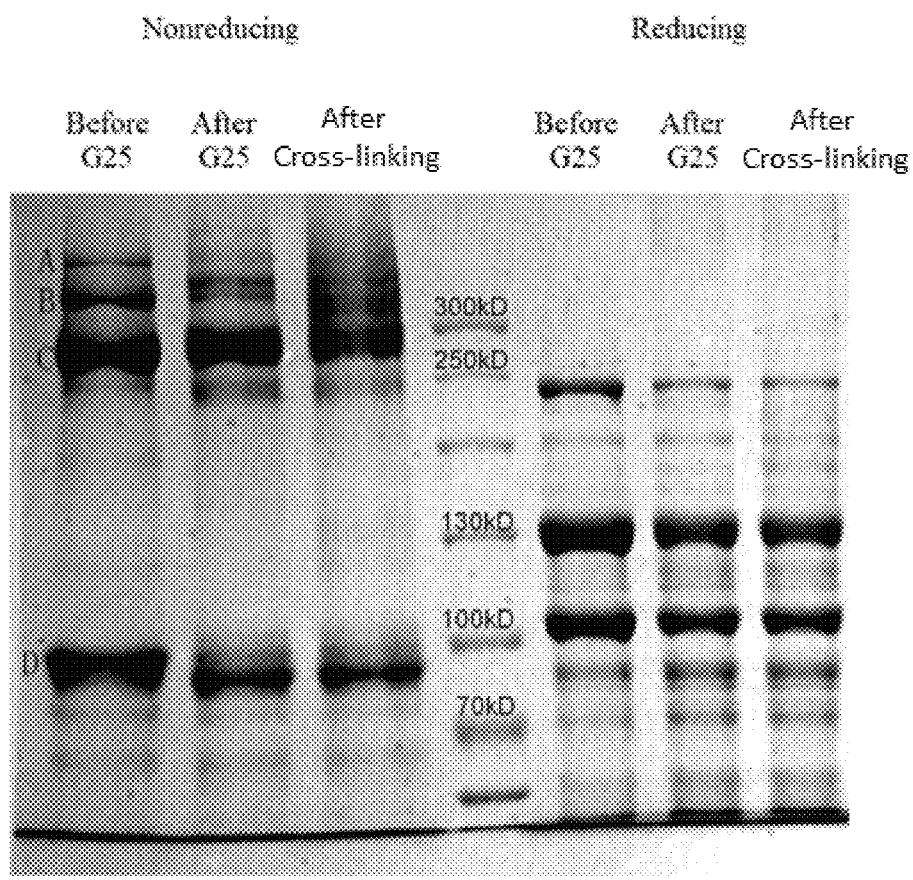
FIG. 3A shows the results of SDS-PAGE detection of the stock solution of hFVIII-Fc (FF-0) without mPEG modification before and after the exchange with G25 (H represents reducing conditions, F represents nonreducing conditions).
Figure 3B:
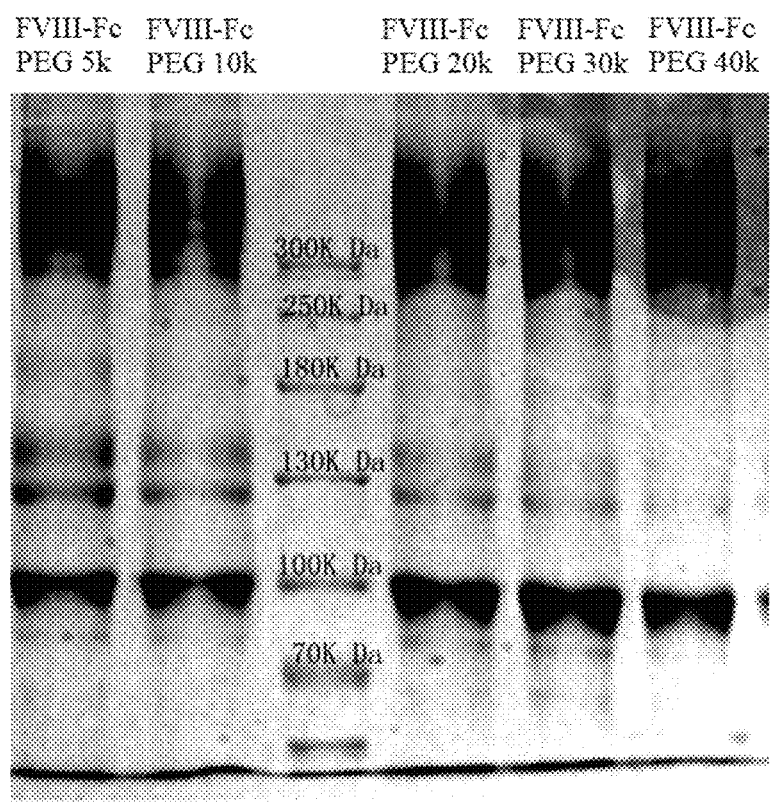
FIG. 3B shows the results of SDS-PAGE detection (nonreducing) of hFVIII-Fc cross-linked with mPEG with different molecular weights (FF-5L to FF-40L).
Figure 3C:
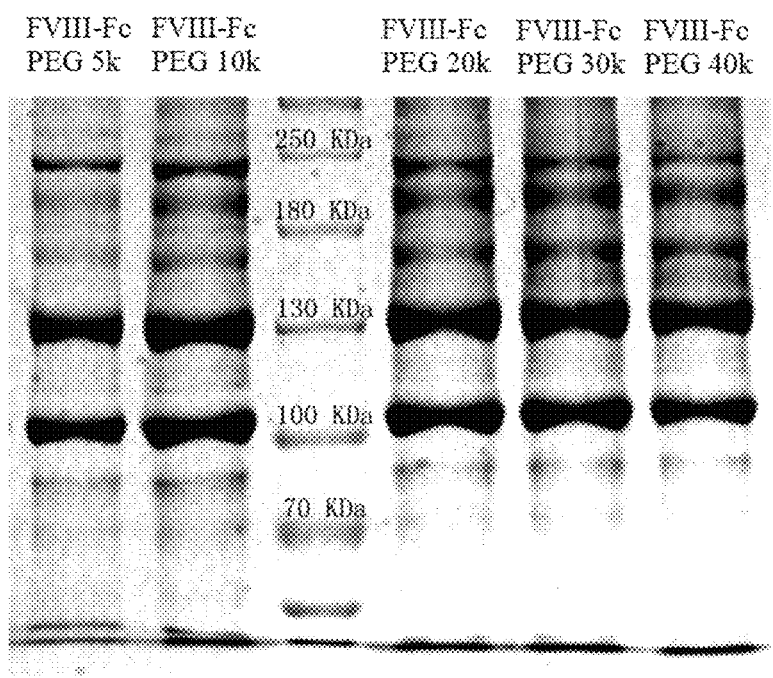
FIG. 3C shows the results of SDS-PAGE detection (reducing) of hFVIII-Fc cross-linked with mPEG with different molecular weights (FF-5L to FF-40L).

(6) Decolorization: stained SDS-PAGE gel was placed in the decolorizing solution and decolorized under shaking, the decolorizing solution was changed every 2 hours, and stopped after the appearance of a clear band visible to the naked eye (7) Record: the completed SDS-PAGE gel was photographed or dried and stored. FIGS. 3a-3c show the results of SDS-PAGE detection of FF-5L to FF-40L.

Example 2

Indirect Determination of In Vitro Activity of mPEG-Modified hFVIII Fusion Protein by Chromogenic Substrate Assay The chromogenic substrate assay was used to determine the activity of the mPEG-modified hFVIII fusion protein prepared in Example 1. ChromogenixCoatest FVIII kit (Chromogenix, Ref. K824086) was used. The detection principle is: after activated by thrombin, in the presence of phospholipids and calcium ions, FVIIIa binds with FIXa to form an enzyme complex, which can activate factor X to convert it into its active form Xa, then active Xa can in turn cleave its specific chromogenic substrate (S-2765) and release the chromophore pNA. By measuring the amount of pNA at 405 nm, the activity of FXa which is directly proportional to the amount of FXa can be determined. Since the content of factor IXa and factor X in the system is excessive, the activity of FXa is only directly related to the content of FVIIIa. The results of indirect determination of FVIII biological activity by chromogenic substrate assay are shown in Table 3.

TABLE 3

Indirect determination of biological activity of FVIII by chromogenic substrate assay

| Name | Biological activity of FVIII by chromogenic substrate assay (IU/mg) | Relative activity to Eloctate |
| --- | --- | --- |
| Eloctate | 8460 | 100% |
| FF-0 | 8500 | 100% |
| FF-5L | 7800 | 92.23% |
| FF-10L | 7300 | 86.3% |
| FF-20L | 6500 | 76.8% |
| FF-30L | 6000 | 70.9% |
| FF-40L | 5000 | 59.1% |
| FF1F-0 | 8500 | 100% |
| FF2F-0 | 8520 | 100.7% |
| FF1F-10L | 3187 | 37.7% |
| FF2F-10L | 3287 | 38.9% |
| FF1F-20L | 4038 | 47.7% |
| FF2F-20L | 4042 | 47.8% |
| FF1F-30L | 4641 | 54.9% |
| FF2F-30L | 4621 | 54.6% |
| FF1F-40L | 3995 | 47.2% |
| FF2F-40L | 3925 | 46.4% |
| FF1F-40Y | 3145 | 37.2% |
| FF2F-40Y | 3245 | 38.2% |
| FF1F-50L | 3230 | 38.4% |
| FF2F-50L | 3830 | 45.3% |
| FF1F-60L | 2720 | 32.2% |
| FF2F-60L | 2920 | 34.5% |
| F(full-length)L1F'-40L | 3900 | 46.1% |
| F(full-length)L1F'-40Y | 3400 | 40.2% |
| F(full-length)L1F'-50L | 3010 | 35.6% |
| F(full-length)L2F''-40L | 3800 | 44.9% |
| F(full-length)L2F''-40Y | 3500 | 41.4% |
| F(full-length)L2F''-50L | 3100 | 36.6% |

Note:
Eloctate is a recombinant VIII Fc fusion protein marketed by Bioverativ. It is not modified by mPEG.

Example 3

Determination of Titer of Human Factor VIII

The assay for determination of coagulation factor VIII titer used in the present disclosure is also referred to as one-stage clotting assay. For specific steps, refer to the third part of the Chinese Pharmacopoeia (2010 version). The one-stage clotting assay for FVIII biological activity was based on the ability to correct the FVIII-deficient plasma to prolong the clotting time. The kit Coagulation Factor VIII Deficient Plasma (Cat. No. OTXW17) from Siemens company (German) was used. The assay was performed as: first, the standard substance WHO International Standard 8th International Standard Standard Factor VIII Concentrate (Cat. No. 07/350) with a known titer was diluted to 4 IU/ml, and then subjected to a gradient dilution to reach different titers (IU/ml); these standard samples were mixed with FVIII deficient plasma to measure the activated partial thromboplastin time (APTT); linear regression of logarithm of the titer (IU/ml) of the FVIII active standard solution against the logarithm of the corresponding clotting time (s) was used to establish a standard curve; then, the sample to be tested was diluted and mixed with FVIII deficient plasma, and the APTT measurement was performed. By fitting to the standard curve, the potency of the FVIII samples can be determined, and the specific activity in IU/mg of the FVIII samples can be calculated. The results are shown in Table 4.

TABLE 4

Direct determination of biological activity by one-stage clotting assay

| Name | Biological activity of FVIII determined by one-stage clotting (IU/mg) | Relative activity to Eloctate |
| --- | --- | --- |
| Eloctate | 7933 | 100% |
| FF-0 | 8200 | 103% |
| FF-5L | 7400 | 93.3% |
| FF-10L | 7000 | 88.2% |
| FF-20L | 6400 | 80.7% |
| FF-30L | 5800 | 73.1% |
| FF-40L | 4800 | 60.5% |
| FF1F-0 | 8200 | 103.4% |
| FF2F-0 | 8300 | 104.6% |
| FF1F-10L | 3075 | 38.8% |
| FF2F-10L | 3075 | 38.8% |

TABLE 4-continued

Direct determination of biological activity by one-stage clotting assay

| Name | Biological activity of FVIII determined by one-stage clotting (IU/mg) | Relative activity to Eloctate |
|---|---|---|
| FF1F-20L | 4046 | 51.0% |
| FF2F-20L | 4026 | 50.8% |
| FF1F-30L | 4590 | 57.9% |
| FF2F-30L | 4520 | 57.0% |
| FF1F-40L | 3995 | 50.4% |
| FF2F-40L | 3925 | 49.5% |
| FF1F-40Y | 3145 | 39.6% |
| FF2F-40Y | 3245 | 40.9% |
| FF1F-50L | 3230 | 40.7% |
| FF2F-50L | 3220 | 40.6% |
| FF1F-60L | 2720 | 34.3% |
| FF2F-60L | 3220 | 40.6% |
| F(full-length)L1F'-40L | 3900 | 49.2% |
| F(full-length)L1F'-40Y | 3200 | 40.3% |
| F(full-length)L1F'-50L | 3100 | 39.1% |
| F(full-length)L2F''-40L | 3800 | 47.9% |
| F(full-length)L2F''-40Y | 3000 | 37.8% |
| F(full-length)L2F''-50L | 3200 | 40.3% |

Table 3 and Table 4 show that the biological activity of FL1F-40Y, FL2F-40Y, F(full-length)L1F'-40Y and F(full-length)L2F'''-40Y measured by the chromogenic substrate assay and the one-stage clotting assay is lower than that of Eloctate/FL1F-0/FL2F-0 without mPEG modification. This is due to the effect of mPEG modification on the spatial structure of the modified protein, and other mPEG-modified proteins (for example, PEG-INTRON, Pegfilgrastim) in the prior art show similar results. Unexpectedly, the FVIII Fc fusion proteins modified with mPEG of 40 kD or higher can still maintain relatively high activity. In addition, follow-up experiments further verified that the half-life of these proteins is greatly extended.

Example 4

Pharmacodynamics Test Using Tail Vein Transection Bleeding Model of Hemophilia a Mice In this example, the half-life of each of the mPEG-modified hFVIII fusion proteins in hemophilia A mice (HA mice) was compared by tail vein transection (TVT) experiments.

4.1. According to the methods reported in the literature, 10-12 weeks old male HA mice (purchased from Shanghai Southern Model Biological Research Center) were randomly divided into groups of 12 mice per group. The mice were administered with the drugs, that is, mPEG-modified fusion proteins of the present disclosure or positive control Eloctate, via the tail vein at a dose of 15 IU/kg, respectively. 48 h after the drug administration, the tail was measured and marked with a cannula with 2.7 mm inner diameter, and transection was performed on the left lateral vein with a gauge 11 straight-edged surgical blade. After transection, the tail was immediately replaced into a tube containing 13 ml of prewarmed saline and the bleeding time was recorded. After the bleeding stopped (no obvious blood flow from the incision), the tail of the mouse was removed from the saline tube, and then the mouse was placed on a heating pad at 37° C. to maintain its body temperature, taking care not to touch the wound. After the mouse woke up, it was put into a cage with white paper on the bottom, each animal in a single cage. The white paper or cage was replaced after each observation in order to determine the degree of bleeding. The survival rate of mice within 48 hours and the number of rebleeding within 12 hours (a total of 12 hours were counted, and multiple bleeding within one hour was counted as one bleeding) after tail transection were counted. The results are shown in Table 5.

The rebleeding rate refers to the proportion of mice with rebleeding during the experiment period. The severe bleeding rate refers to proportion of mice with severe bleeding (+++) or multiple moderate bleedings (++) within the 12 hs period. Among them, moderate bleeding (++) refers to: there are a lot of blood stains on the white paper with a coverage area not less than 30%, and the blood stains are medium in color, but there is no blood pool with large area (area>3 $cm^2$); severe bleeding (+++) refers to: there are a lot of blood stains on the white paper with a coverage area not less than 30%, the blood stains are heavy in color, and there are blood pools with large area; in some case, even if the coverage area is small, mice can be counted as with severe bleeding when the mice lose a lot of blood, the range of motion is reduced, and the white paper is seriously soaked with blood.

TABLE 5

48 h survival rate and 12 h rebleeding rate in TVT experiment 48 h after drug administration

| Name | 12 h rebleeding rate | Severe bleeding rate | 48 h survival rate |
|---|---|---|---|
| Eloctate | 66.7% (8/12) | 16.7% (2/12) | 75.0% (9/12) |
| FL1F-0 | 83.3% (10/12) | 33.3% (4/12) | 25.0% (3/12) |
| FL1F-20L | 83.3% (10/12) | 33.3% (4/12) | 41.7% (5/12) |
| FL1F-40L | 66.7% (8/12) | 16.7% (2/12) | 75.0% (9/12) |
| FL1F-40Y | 58.3% (7/12) | 8.3% (1/12) | 83.3% (10/12) |
| FL1F-50L | 75.0% (9/12) | 25.0% (3/12) | 58.3% (7/12) |
| FL1F-60L | 66.7% (8/12) | 25.0% (3/12) | 66.7% (8/12) |
| FL2F-0 | 83.3% (10/12) | 33.3% (4/12) | 33.3% (4/12) |
| FL2F-20L | 75.0% (9/12) | 25.0% (3/12) | 41.6% (5/12) |
| FL2F-40L | 75.0% (9/12) | 16.7% (2/12) | 66.7% (8/12) |
| FL2F-40Y | 63.3% (7/11) | 9.1% (1/11) | 81.8% (9/11) |
| FL2F-50L | 66.7% (8/12) | 16.7% (2/12) | 58.3% (7/12) |
| FL2F-60L | 66.7% (8/12) | 25.0% (3/12) | 50.0% (6/12) |
| F(full-length)L1F'-40L | 75.0% (9/12) | 16.7% (2/12) | 66.7% (8/12) |
| F(full-length)L1F'-40Y | 66.7 (8/12) | 8.3% (1/12) | 83.3% (10/12) |

TABLE 5-continued 48 h survival rate and 12 h rebleeding rate in
TVT experiment 48 h after drug administration

| Name | 12 h rebleeding rate | Severe bleeding rate | 48 h survival rate |
|---|---|---|---|
| F(full-length)L1F'-50L | 66.7% (8/12) | 25.0% (3/12) | 50.0% (6/12) |
| F(full-length)L2F"-40L | 75.0% (9/12) | 8.3% (1/12) | 58.3% (7/12) |
| F(full-length)L2F"'-40Y | 58.3% (7/12) | 8.3% (1/12) | 83.3% (10/12) |
| F(full-length)L2F"'-50L | 75.0% (9/12) | 16.7% (2/12) | 58.3% (7/12) |

The results show that, compared with the Elocate/FL1F-0/FL2F-0 groups without mPEG modification, the FL1F-40Y group, the FL2F-40Y group, the F(full-length)L1F'-40Y group and the F(full-length)L2F"'-40Y group have survival rate of 83.3%, 75.0%, 83.3% and 83.3%, respectively, significantly higher than that of other groups. In addition, these groups have significantly low 12 hs rebleeding rate and low severe bleeding rate compared with other groups. Therefore, FL1F-40Y, FL2F-40Y, F (full-length) L1F'-40Y and F (full-length) L2F"'-40Y provide longer protection time in the tail vein transection model of hemophilia A mice.

4.2. The same method described in 4.1 was used to perform TVT experiment on 10-12 weeks old male HA mice, 12 mice per group, 84 h after drug administration. The results are shown in Table 6.

TABLE 6

48 h survival rate and 12 h rebleeding rate in
TVT experiment 48 h after drug administration

| Name | 48 h survival rate | 12 h rebleeding rate |
|---|---|---|
| Eloctate | 66.7% (8/12) | 83.3% (10/12) |
| FL1F-40L | 50% (6/12) | 83.3% (10/12) |
| FL2F-40L | 58.3% (7/12) | 91.7% (11/12) |
| FL1F-40Y | 66.7% (8/12) | 75.0% (9/12) |
| FL2F-40Y | 75.0% (9/12) | 75.0% (9/12) |
| FL1F-50L | 50% (6/12) | 100% (12/12) |
| FL2F-50L | 33.3% (4/12) | 100% (12/12) |
| FL1F-60L | 58.3% (7/12) | 83.3% (10/12) |
| FL2F-60L | 41.7% (5/12) | 83.3% (10/12) |
| F(full-length)L1F'-40L | 66.7% (8/12) | 75.0% (9/12) |
| F(full-length)L1F'-40Y | 75.0% (9/12) | 66.7% (8/12) |
| F(full-length)L1F'-50L | 58.3% (7/12) | 91.7% (11/12) |
| F(full-length)L2F"'-40L | 41.7% (5/12) | 91.7% (11/12) |
| F(full-length)L2F"'-40Y | 75.0% (9/12) | 75.0% (9/12) |
| F(full-length)L2F"'-50L | 58.3% (7/12) | 91.7% (11/12) |

The results show that compared with Eloctate and other groups without PEG modification, the FL1F-40Y group, the FL2F-40Y group, the F(full-length)L1F'-40Y group and the F(full-length)L2F"'-40Y group have survival rate of 66.7%, 75.0%, 75.0% and 75.0%, respectively, significantly higher than that of other groups, and rebleeding rate is significantly reduced. Therefore, FL1F-40Y, FL2F-40Y, F(full-length) L1F'-40Y and F(full-length)L2F"'-40Y still show certain effect on preventing bleeding in the tail vein transection model of hemophilia A mice 84 h after drug administration.

4.3. The same method as described in 4.1 was used to perform TVT experiment on 10-12 weeks old HA mice, 20 mice (10 males and 10 females)/group, 90 hours after the drug administration. The results are shown in Table 7.

TABLE 7

48 h survival rate and 12 h rebleeding rate in
TVT experiment 90 h after drug administration

| Name | 48 h survival rate | 12 h rebleeding rate |
|---|---|---|
| Eloctate | 70% | 80% |
| FL1F-40L | 55% | 70% |
| FL2F-40L | 63.2% | 73.68% |
| FL1F-50L | 84.2% | 68.4% |
| FL2F-50L | 40% | 90% |

The results show that the FL1F-50L has similar survival rate and rebleeding rate compared to the Elocateate group without PEG modification. Because the experimental animals are not single-sex, the experimental results are not compared with other single-sex experiments.

4.4. The same method as described in 4.1 was used to perform a TVT experiment on 10-12 weeks old male HA mice, 12 mice/group, at 96 h after drug administration. The results are shown in Table 8.

TABLE 8

48 h survival rate and 12 h rebleeding rate in
TVT experiment 96 h after drug administration

| Name | 48 h survival rate | 12 h rebleeding rate |
|---|---|---|
| Eloctate | 50% | 91.7% |
| FL1F-30Y | 8.3% | 91.7% |
| FL2F-30Y | 16.7% | 83.3% |
| FL1F-40Y | 63.6% | 54.5% |
| FL2F-40Y | 54.5% | 54.5% |
| FL1F-50L | 16.7% | 91.7% |
| FL2F-50L | 25.0% | 83.3% |

The results show that, compared with Eloctate group without PEG modification, FL1F-40Y/FL2F-40Y has slight improved survival rate, and significantly reduced 12 h rebleeding rate. FL1F-40Y/FL2F-40Y have significantly improved survival rate compared with other groups, and significantly reduced 12 h rebleeding rate compared with other groups. Therefore, the FL1F-40Y/FL2F-40Y groups have a longer prevention time than other groups in the tail vein transected model of hemophilia A mice.

The above are only preferred embodiments of the present disclosure and are not intended to limit the present disclosure. Any modification, equivalent replacement, or improvement made within the spirit and principle of the present disclosure should be included in the scope of protection of the present disclosure.

The invention claimed is:

1. A polyalkylene glycol-conjugated coagulation factor VIII fusion protein, wherein the coagulation factor VIII active moiety (FVIII) is directly or indirectly linked to a fusion partner for prolonging half-life via a peptide linker to form the fusion protein, and the fusion protein is further conjugated to the polyalkylene glycol;
wherein the fusion partner is an immunoglobulin Fc fragment and the polyalkylene glycol is 40 kD branched polyethylene glycol;
the coagulation factor VIII active moiety is linked to the fusion partner via a peptide linker and the peptide linker includes a flexible peptide segment and a rigid peptide segment;
the rigid peptide segment is the carboxy terminal peptide of human chorionic gonadotropin β subunit and the rigid peptide segment comprises an amino acid sequence selected from:

(i)
                                                    (SEQ ID NO: 11)
PRFQDSSSSKAPPPSLPSPSRLPGPSDTPILPQ;

(ii)
                                                    (SEQ ID NO: 12)
SSSSKAPPPSLPSPSRLPGPSDTPILPQ;

(iii)
                                                    (SEQ ID NO: 13)
SSSSKAPPPS;
and (iv)
                                                    (SEQ ID NO: 14)
SRLPGPSDTPILPQ;

and the flexible peptide segment has a general formula (GS)a(GGS)b(GGGS)c(GGGGS)d, where a, b, c and d are integers greater than or equal to 0, and a+b+c+d≥1, and the flexible peptide segment has a sequence selected from the group consisting of:

(i)
                                                    (SEQ ID NO: 6)
GSGGGSGGGGSGGGGS;

(ii)
                                                    (SEQ ID NO: 7)
GSGGGGSGGGGSGGGGSGGGGSGGGGS;

(iii)
                                                    (SEQ ID NO: 8)
GGGGSGGGGSGGGGSGGGGS;

(iv)
                                                    (SEQ ID NO: 9)
GSGGGGSGGGGSGGGGSGGGGSGGGGSGGGGSGGGGS;
and (v)
                                                    (SEQ ID NO: 10)
GGGSGGGSGGGSGGGSGGGS.

2. The polyalkylene glycol-conjugated coagulation factor VIII fusion protein according to claim 1, wherein the coagulation factor VIII active moiety is a full-length or truncated human coagulation factor VIII derived from human, and wherein the full-length or truncated human coagulation factor VIII may contain one or more amino acid mutations, provided that it still retains the FVIII activity.

3. The polyalkylene glycol-conjugated coagulation factor VIII fusion protein according to claim 1, wherein the conjugation of the fusion protein and the branched polyethylene glycol is at a random or specific position, and the conjugation position is selected from the group consisting of a free amino group, sulfhydryl group, sugar group and carboxyl group.

4. The polyalkylene glycol-conjugated coagulation factor VIII fusion protein according to claim 3, wherein a modifier is used for the conjugation, and the modifier is represented by:

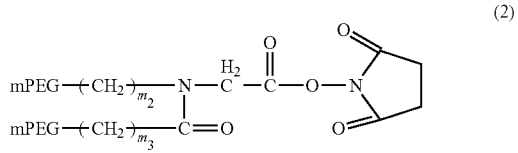

(2)

wherein 0≤m2≤6, 0≤m3≤6, and mPEG represents a monomethoxy terminated polyethylene glycol group.

5. A pharmaceutical composition comprising an effective amount of the polyalkylene glycol-conjugated coagulation factor VIII fusion protein according to claim 1, and a pharmaceutically acceptable carrier.

6. A method for preventing and/or treating hemorrhagic diseases, comprising administering to a subject in need thereof the polyalkylene glycol-conjugated coagulation factor VIII fusion protein according to claim 1, wherein the hemorrhagic disease is selected from hemorrhagic diseases in patients with congenital or acquired deficiency of FVIII, and spontaneous or surgical bleeding in patients with hemophilia A.

7. The polyalkylene glycol-conjugated coagulation factor VIII fusion protein according to claim 2, wherein the coagulation factor VIII active moiety comprises the amino acid sequence shown in SEQ ID NO: 1 or 2.

8. The polyalkylene glycol-conjugated coagulation factor VIII fusion protein according to claim 1, wherein the fusion partner is an IgG Fc fragment with reduced ADCC effect and/or CDC effect and/or enhanced binding affinity to the FcRn receptor, and wherein the IgG Fc fragment having an amino acid sequence selected from the group consisting of:
(i) the amino acid sequence shown in SEQ ID NO: 3,
(ii) the amino acid sequence shown in SEQ ID NO: 4, and
(iii) the amino acid sequence shown in SEQ ID NO: 5.

9. The polyalkylene glycol-conjugated coagulation factor VIII fusion protein according to claim 1, wherein the branched polyethylene glycol is end-capped with methoxy.

10. The polyalkylene glycol-conjugated coagulation factor VIII fusion protein according to claim 1, wherein the peptide linker comprises the amino acid sequence shown in SEQ ID NO: 15.

* * * * *

SEQUENCE LISTING

<160> NUMBER OF SEQ ID NOS: 15

<210> SEQ ID NO 1
<211> LENGTH: 2332
<212> TYPE: PRT
<213> ORGANISM: Homo sapiens

<400> SEQUENCE: 1

```
Ala Thr Arg Arg Tyr Tyr Leu Gly Ala Val Glu Leu Ser Trp Asp Tyr
1               5                   10                  15

Met Gln Ser Asp Leu Gly Glu Leu Pro Val Asp Ala Arg Phe Pro Pro
            20                  25                  30

Arg Val Pro Lys Ser Phe Pro Phe Asn Thr Ser Val Val Tyr Lys Lys
        35                  40                  45

Thr Leu Phe Val Glu Phe Thr Asp His Leu Phe Asn Ile Ala Lys Pro
    50                  55                  60

Arg Pro Pro Trp Met Gly Leu Leu Gly Pro Thr Ile Gln Ala Glu Val
65                  70                  75                  80

Tyr Asp Thr Val Val Ile Thr Leu Lys Asn Met Ala Ser His Pro Val
                85                  90                  95

Ser Leu His Ala Val Gly Val Ser Tyr Trp Lys Ala Ser Glu Gly Ala
            100                 105                 110

Glu Tyr Asp Asp Gln Thr Ser Gln Arg Glu Lys Glu Asp Asp Lys Val
        115                 120                 125

Phe Pro Gly Gly Ser His Thr Tyr Val Trp Gln Val Leu Lys Glu Asn
    130                 135                 140

Gly Pro Met Ala Ser Asp Pro Leu Cys Leu Thr Tyr Ser Tyr Leu Ser
145                 150                 155                 160

His Val Asp Leu Val Lys Asp Leu Asn Ser Gly Leu Ile Gly Ala Leu
                165                 170                 175

Leu Val Cys Arg Glu Gly Ser Leu Ala Lys Glu Lys Thr Gln Thr Leu
            180                 185                 190

His Lys Phe Ile Leu Leu Phe Ala Val Phe Asp Glu Gly Lys Ser Trp
        195                 200                 205

His Ser Glu Thr Lys Asn Ser Leu Met Gln Asp Arg Asp Ala Ala Ser
    210                 215                 220

Ala Arg Ala Trp Pro Lys Met His Thr Val Asn Gly Tyr Val Asn Arg
225                 230                 235                 240

Ser Leu Pro Gly Leu Ile Gly Cys His Arg Lys Ser Val Tyr Trp His
                245                 250                 255

Val Ile Gly Met Gly Thr Thr Pro Glu Val His Ser Ile Phe Leu Glu
            260                 265                 270

Gly His Thr Phe Leu Val Arg Asn His Arg Gln Ala Ser Leu Glu Ile
        275                 280                 285

Ser Pro Ile Thr Phe Leu Thr Ala Gln Thr Leu Leu Met Asp Leu Gly
    290                 295                 300

Gln Phe Leu Leu Phe Cys His Ile Ser Ser His Gln His Asp Gly Met
305                 310                 315                 320

Glu Ala Tyr Val Lys Val Asp Ser Cys Pro Glu Glu Pro Gln Leu Arg
                325                 330                 335

Met Lys Asn Asn Glu Glu Ala Glu Asp Tyr Asp Asp Asp Leu Thr Asp
            340                 345                 350

Ser Glu Met Asp Val Val Arg Phe Asp Asp Asp Asn Ser Pro Ser Phe
        355                 360                 365
```

```
Ile Gln Ile Arg Ser Val Ala Lys Lys His Pro Lys Thr Trp Val His
370                 375                 380
Tyr Ile Ala Ala Glu Glu Asp Trp Asp Tyr Ala Pro Leu Val Leu
385                 390                 395                 400
Ala Pro Asp Asp Arg Ser Tyr Lys Ser Gln Tyr Leu Asn Asn Gly Pro
                405                 410                 415
Gln Arg Ile Gly Arg Lys Tyr Lys Val Arg Phe Met Ala Tyr Thr
            420                 425                 430
Asp Glu Thr Phe Lys Thr Arg Glu Ala Ile Gln His Glu Ser Gly Ile
                435                 440                 445
Leu Gly Pro Leu Leu Tyr Gly Glu Val Gly Asp Thr Leu Leu Ile Ile
450                 455                 460
Phe Lys Asn Gln Ala Ser Arg Pro Tyr Asn Ile Tyr Pro His Gly Ile
465                 470                 475                 480
Thr Asp Val Arg Pro Leu Tyr Ser Arg Arg Leu Pro Lys Gly Val Lys
                485                 490                 495
His Leu Lys Asp Phe Pro Ile Leu Pro Gly Glu Ile Phe Lys Tyr Lys
                500                 505                 510
Trp Thr Val Thr Val Glu Asp Gly Pro Thr Lys Ser Asp Pro Arg Cys
            515                 520                 525
Leu Thr Arg Tyr Tyr Ser Ser Phe Val Asn Met Glu Arg Asp Leu Ala
530                 535                 540
Ser Gly Leu Ile Gly Pro Leu Leu Ile Cys Tyr Lys Glu Ser Val Asp
545                 550                 555                 560
Gln Arg Gly Asn Gln Ile Met Ser Asp Lys Arg Asn Val Ile Leu Phe
                565                 570                 575
Ser Val Phe Asp Glu Asn Arg Ser Trp Tyr Leu Thr Glu Asn Ile Gln
                580                 585                 590
Arg Phe Leu Pro Asn Pro Ala Gly Val Gln Leu Glu Asp Pro Glu Phe
            595                 600                 605
Gln Ala Ser Asn Ile Met His Ser Ile Asn Gly Tyr Val Phe Asp Ser
        610                 615                 620
Leu Gln Leu Ser Val Cys Leu His Glu Val Ala Tyr Trp Tyr Ile Leu
625                 630                 635                 640
Ser Ile Gly Ala Gln Thr Asp Phe Leu Ser Val Phe Phe Ser Gly Tyr
                645                 650                 655
Thr Phe Lys His Lys Met Val Tyr Glu Asp Thr Leu Thr Leu Phe Pro
                660                 665                 670
Phe Ser Gly Glu Thr Val Phe Met Ser Met Glu Asn Pro Gly Leu Trp
            675                 680                 685
Ile Leu Gly Cys His Asn Ser Asp Phe Arg Asn Arg Gly Met Thr Ala
        690                 695                 700
Leu Leu Lys Val Ser Ser Cys Asp Lys Asn Thr Gly Asp Tyr Tyr Glu
705                 710                 715                 720
Asp Ser Tyr Glu Asp Ile Ser Ala Tyr Leu Leu Ser Lys Asn Asn Ala
                725                 730                 735
Ile Glu Pro Arg Ser Phe Ser Gln Asn Ser Arg His Pro Ser Thr Arg
                740                 745                 750
Gln Lys Gln Phe Asn Ala Thr Thr Ile Pro Glu Asn Asp Ile Glu Lys
            755                 760                 765
Thr Asp Pro Trp Phe Ala His Arg Thr Pro Met Pro Lys Ile Gln Asn
770                 775                 780
Val Ser Ser Ser Asp Leu Leu Met Leu Leu Arg Gln Ser Pro Thr Pro
```

```
            785                 790                 795                 800
His Gly Leu Ser Leu Ser Asp Leu Gln Glu Ala Lys Tyr Glu Thr Phe
                    805                 810                 815

Ser Asp Asp Pro Ser Pro Gly Ala Ile Asp Ser Asn Asn Ser Leu Ser
                    820                 825                 830

Glu Met Thr His Phe Arg Pro Gln Leu His His Ser Gly Asp Met Val
                    835                 840                 845

Phe Thr Pro Glu Ser Gly Leu Gln Leu Arg Leu Asn Glu Lys Leu Gly
                    850                 855                 860

Thr Thr Ala Ala Thr Glu Leu Lys Lys Leu Asp Phe Lys Val Ser Ser
865                 870                 875                 880

Thr Ser Asn Asn Leu Ile Ser Thr Ile Pro Ser Asp Asn Leu Ala Ala
                    885                 890                 895

Gly Thr Asp Asn Thr Ser Ser Leu Gly Pro Pro Ser Met Pro Val His
                    900                 905                 910

Tyr Asp Ser Gln Leu Asp Thr Thr Leu Phe Gly Lys Lys Ser Ser Pro
                    915                 920                 925

Leu Thr Glu Ser Gly Gly Pro Leu Ser Leu Ser Glu Glu Asn Asn Asp
    930                 935                 940

Ser Lys Leu Leu Glu Ser Gly Leu Met Asn Ser Gln Glu Ser Ser Trp
945                 950                 955                 960

Gly Lys Asn Val Ser Ser Thr Glu Ser Gly Arg Leu Phe Lys Gly Lys
                    965                 970                 975

Arg Ala His Gly Pro Ala Leu Leu Thr Lys Asp Asn Ala Leu Phe Lys
                    980                 985                 990

Val Ser Ile Ser Leu Leu Lys Thr  Asn Lys Thr Ser Asn  Asn Ser Ala
        995                 1000                1005

Thr Asn  Arg Lys Thr His Ile  Asp Gly Pro Ser Leu  Leu Ile Glu
    1010                1015                1020

Asn Ser  Pro Ser Val Trp Gln  Asn Ile Leu Glu Ser  Asp Thr Glu
    1025                1030                1035

Phe Lys  Lys Val Thr Pro Leu  Ile His Asp Arg Met  Leu Met Asp
    1040                1045                1050

Lys Asn  Ala Thr Ala Leu Arg  Leu Asn His Met Ser  Asn Lys Thr
    1055                1060                1065

Thr Ser  Ser Lys Asn Met Glu  Met Val Gln Gln Lys  Lys Glu Gly
    1070                1075                1080

Pro Ile  Pro Pro Asp Ala Gln  Asn Pro Asp Met Ser  Phe Phe Lys
    1085                1090                1095

Met Leu  Phe Leu Pro Glu Ser  Ala Arg Trp Ile Gln  Arg Thr His
    1100                1105                1110

Gly Lys  Asn Ser Leu Asn Ser  Gly Gln Gly Pro Ser  Pro Lys Gln
    1115                1120                1125

Leu Val  Ser Leu Gly Pro Glu  Lys Ser Val Glu Gly  Gln Asn Phe
    1130                1135                1140

Leu Ser  Glu Lys Asn Lys Val  Val Val Gly Lys Gly  Glu Phe Thr
    1145                1150                1155

Lys Asp  Val Gly Leu Lys Glu  Met Val Phe Pro Ser  Ser Arg Asn
    1160                1165                1170

Leu Phe  Leu Thr Asn Leu Asp  Asn Leu His Glu Asn  Asn Thr His
    1175                1180                1185

Asn Gln  Glu Lys Lys Ile Gln  Glu Glu Ile Glu Lys  Lys Glu Thr
    1190                1195                1200
```

```
Leu Ile Gln Glu Asn Val Val Leu Pro Gln Ile His Thr Val Thr
    1205             1210             1215

Gly Thr Lys Asn Phe Met Lys Asn Leu Phe Leu Leu Ser Thr Arg
    1220             1225             1230

Gln Asn Val Glu Gly Ser Tyr Asp Gly Ala Tyr Ala Pro Val Leu
    1235             1240             1245

Gln Asp Phe Arg Ser Leu Asn Asp Ser Thr Asn Arg Thr Lys Lys
    1250             1255             1260

His Thr Ala His Phe Ser Lys Lys Gly Glu Glu Glu Asn Leu Glu
    1265             1270             1275

Gly Leu Gly Asn Gln Thr Lys Gln Ile Val Glu Lys Tyr Ala Cys
    1280             1285             1290

Thr Thr Arg Ile Ser Pro Asn Thr Ser Gln Gln Asn Phe Val Thr
    1295             1300             1305

Gln Arg Ser Lys Arg Ala Leu Lys Gln Phe Arg Leu Pro Leu Glu
    1310             1315             1320

Glu Thr Glu Leu Glu Lys Arg Ile Ile Val Asp Asp Thr Ser Thr
    1325             1330             1335

Gln Trp Ser Lys Asn Met Lys His Leu Thr Pro Ser Thr Leu Thr
    1340             1345             1350

Gln Ile Asp Tyr Asn Glu Lys Glu Lys Gly Ala Ile Thr Gln Ser
    1355             1360             1365

Pro Leu Ser Asp Cys Leu Thr Arg Ser His Ser Ile Pro Gln Ala
    1370             1375             1380

Asn Arg Ser Pro Leu Pro Ile Ala Lys Val Ser Ser Phe Pro Ser
    1385             1390             1395

Ile Arg Pro Ile Tyr Leu Thr Arg Val Leu Phe Gln Asp Asn Ser
    1400             1405             1410

Ser His Leu Pro Ala Ala Ser Tyr Arg Lys Lys Asp Ser Gly Val
    1415             1420             1425

Gln Glu Ser Ser His Phe Leu Gln Gly Ala Lys Lys Asn Asn Leu
    1430             1435             1440

Ser Leu Ala Ile Leu Thr Leu Glu Met Thr Gly Asp Gln Arg Glu
    1445             1450             1455

Val Gly Ser Leu Gly Thr Ser Ala Thr Asn Ser Val Thr Tyr Lys
    1460             1465             1470

Lys Val Glu Asn Thr Val Leu Pro Lys Pro Asp Leu Pro Lys Thr
    1475             1480             1485

Ser Gly Lys Val Glu Leu Leu Pro Lys Val His Ile Tyr Gln Lys
    1490             1495             1500

Asp Leu Phe Pro Thr Glu Thr Ser Asn Gly Ser Pro Gly His Leu
    1505             1510             1515

Asp Leu Val Glu Gly Ser Leu Leu Gln Gly Thr Glu Gly Ala Ile
    1520             1525             1530

Lys Trp Asn Glu Ala Asn Arg Pro Gly Lys Val Pro Phe Leu Arg
    1535             1540             1545

Val Ala Thr Glu Ser Ser Ala Lys Thr Pro Ser Lys Leu Leu Asp
    1550             1555             1560

Pro Leu Ala Trp Asp Asn His Tyr Gly Thr Gln Ile Pro Lys Glu
    1565             1570             1575

Glu Trp Lys Ser Gln Glu Lys Ser Pro Glu Lys Thr Ala Phe Lys
    1580             1585             1590
```

-continued

```
Lys Lys Asp Thr Ile Leu Ser Leu Asn Ala Cys Glu Ser Asn His
    1595                1600                1605

Ala Ile Ala Ala Ile Asn Glu Gly Gln Asn Lys Pro Glu Ile Glu
    1610                1615                1620

Val Thr Trp Ala Lys Gln Gly Arg Thr Glu Arg Leu Cys Ser Gln
    1625                1630                1635

Asn Pro Pro Val Leu Lys Arg His Gln Arg Glu Ile Thr Arg Thr
    1640                1645                1650

Thr Leu Gln Ser Asp Gln Glu Glu Ile Asp Tyr Asp Asp Thr Ile
    1655                1660                1665

Ser Val Glu Met Lys Lys Glu Asp Phe Asp Ile Tyr Asp Glu Asp
    1670                1675                1680

Glu Asn Gln Ser Pro Arg Ser Phe Gln Lys Lys Thr Arg His Tyr
    1685                1690                1695

Phe Ile Ala Ala Val Glu Arg Leu Trp Asp Tyr Gly Met Ser Ser
    1700                1705                1710

Ser Pro His Val Leu Arg Asn Arg Ala Gln Ser Gly Ser Val Pro
    1715                1720                1725

Gln Phe Lys Lys Val Val Phe Gln Glu Phe Thr Asp Gly Ser Phe
    1730                1735                1740

Thr Gln Pro Leu Tyr Arg Gly Glu Leu Asn Glu His Leu Gly Leu
    1745                1750                1755

Leu Gly Pro Tyr Ile Arg Ala Glu Val Glu Asp Asn Ile Met Val
    1760                1765                1770

Thr Phe Arg Asn Gln Ala Ser Arg Pro Tyr Ser Phe Tyr Ser Ser
    1775                1780                1785

Leu Ile Ser Tyr Glu Glu Asp Gln Arg Gln Gly Ala Glu Pro Arg
    1790                1795                1800

Lys Asn Phe Val Lys Pro Asn Glu Thr Lys Thr Tyr Phe Trp Lys
    1805                1810                1815

Val Gln His His Met Ala Pro Thr Lys Asp Glu Phe Asp Cys Lys
    1820                1825                1830

Ala Trp Ala Tyr Phe Ser Asp Val Asp Leu Glu Lys Asp Val His
    1835                1840                1845

Ser Gly Leu Ile Gly Pro Leu Leu Val Cys His Thr Asn Thr Leu
    1850                1855                1860

Asn Pro Ala His Gly Arg Gln Val Thr Val Gln Glu Phe Ala Leu
    1865                1870                1875

Phe Phe Thr Ile Phe Asp Glu Thr Lys Ser Trp Tyr Phe Thr Glu
    1880                1885                1890

Asn Met Glu Arg Asn Cys Arg Ala Pro Cys Asn Ile Gln Met Glu
    1895                1900                1905

Asp Pro Thr Phe Lys Glu Asn Tyr Arg Phe His Ala Ile Asn Gly
    1910                1915                1920

Tyr Ile Met Asp Thr Leu Pro Gly Leu Val Met Ala Gln Asp Gln
    1925                1930                1935

Arg Ile Arg Trp Tyr Leu Leu Ser Met Gly Ser Asn Glu Asn Ile
    1940                1945                1950

His Ser Ile His Phe Ser Gly His Val Phe Thr Val Arg Lys Lys
    1955                1960                1965

Glu Glu Tyr Lys Met Ala Leu Tyr Asn Leu Tyr Pro Gly Val Phe
    1970                1975                1980

Glu Thr Val Glu Met Leu Pro Ser Lys Ala Gly Ile Trp Arg Val
```

```
                1985                1990                1995
Glu Cys Leu Ile Gly Glu His Leu His Ala Gly Met Ser Thr Leu
    2000                2005                2010

Phe Leu Val Tyr Ser Asn Lys Cys Gln Thr Pro Leu Gly Met Ala
    2015                2020                2025

Ser Gly His Ile Arg Asp Phe Gln Ile Thr Ala Ser Gly Gln Tyr
    2030                2035                2040

Gly Gln Trp Ala Pro Lys Leu Ala Arg Leu His Tyr Ser Gly Ser
    2045                2050                2055

Ile Asn Ala Trp Ser Thr Lys Glu Pro Phe Ser Trp Ile Lys Val
    2060                2065                2070

Asp Leu Leu Ala Pro Met Ile Ile His Gly Ile Lys Thr Gln Gly
    2075                2080                2085

Ala Arg Gln Lys Phe Ser Ser Leu Tyr Ile Ser Gln Phe Ile Ile
    2090                2095                2100

Met Tyr Ser Leu Asp Gly Lys Lys Trp Gln Thr Tyr Arg Gly Asn
    2105                2110                2115

Ser Thr Gly Thr Leu Met Val Phe Phe Gly Asn Val Asp Ser Ser
    2120                2125                2130

Gly Ile Lys His Asn Ile Phe Asn Pro Pro Ile Ile Ala Arg Tyr
    2135                2140                2145

Ile Arg Leu His Pro Thr His Tyr Ser Ile Arg Ser Thr Leu Arg
    2150                2155                2160

Met Glu Leu Met Gly Cys Asp Leu Asn Ser Cys Ser Met Pro Leu
    2165                2170                2175

Gly Met Glu Ser Lys Ala Ile Ser Asp Ala Gln Ile Thr Ala Ser
    2180                2185                2190

Ser Tyr Phe Thr Asn Met Phe Ala Thr Trp Ser Pro Ser Lys Ala
    2195                2200                2205

Arg Leu His Leu Gln Gly Arg Ser Asn Ala Trp Arg Pro Gln Val
    2210                2215                2220

Asn Asn Pro Lys Glu Trp Leu Gln Val Asp Phe Gln Lys Thr Met
    2225                2230                2235

Lys Val Thr Gly Val Thr Thr Gln Gly Val Lys Ser Leu Leu Thr
    2240                2245                2250

Ser Met Tyr Val Lys Glu Phe Leu Ile Ser Ser Ser Gln Asp Gly
    2255                2260                2265

His Gln Trp Thr Leu Phe Phe Gln Asn Gly Lys Val Lys Val Phe
    2270                2275                2280

Gln Gly Asn Gln Asp Ser Phe Thr Pro Val Val Asn Ser Leu Asp
    2285                2290                2295

Pro Pro Leu Leu Thr Arg Tyr Leu Arg Ile His Pro Gln Ser Trp
    2300                2305                2310

Val His Gln Ile Ala Leu Arg Met Glu Val Leu Gly Cys Glu Ala
    2315                2320                2325

Gln Asp Leu Tyr
    2330

<210> SEQ ID NO 2
<211> LENGTH: 1438
<212> TYPE: PRT
<213> ORGANISM: Homo sapiens

<400> SEQUENCE: 2
```

-continued

```
Ala Thr Arg Arg Tyr Tyr Leu Gly Ala Val Glu Leu Ser Trp Asp Tyr
1               5                   10                  15

Met Gln Ser Asp Leu Gly Glu Leu Pro Val Asp Ala Arg Phe Pro Pro
            20                  25                  30

Arg Val Pro Lys Ser Phe Pro Phe Asn Thr Ser Val Val Tyr Lys Lys
                35                  40                  45

Thr Leu Phe Val Glu Phe Thr Asp His Leu Phe Asn Ile Ala Lys Pro
        50                  55                  60

Arg Pro Pro Trp Met Gly Leu Leu Gly Pro Thr Ile Gln Ala Glu Val
65                  70                  75                  80

Tyr Asp Thr Val Val Ile Thr Leu Lys Asn Met Ala Ser His Pro Val
                85                  90                  95

Ser Leu His Ala Val Gly Val Ser Tyr Trp Lys Ala Ser Glu Gly Ala
            100                 105                 110

Glu Tyr Asp Asp Gln Thr Ser Gln Arg Glu Lys Glu Asp Asp Lys Val
            115                 120                 125

Phe Pro Gly Gly Ser His Thr Tyr Val Trp Gln Val Leu Lys Glu Asn
    130                 135                 140

Gly Pro Met Ala Ser Asp Pro Leu Cys Leu Thr Tyr Ser Tyr Leu Ser
145                 150                 155                 160

His Val Asp Leu Val Lys Asp Leu Asn Ser Gly Leu Ile Gly Ala Leu
                165                 170                 175

Leu Val Cys Arg Glu Gly Ser Leu Ala Lys Glu Lys Thr Gln Thr Leu
            180                 185                 190

His Lys Phe Ile Leu Leu Phe Ala Val Phe Asp Glu Gly Lys Ser Trp
        195                 200                 205

His Ser Glu Thr Lys Asn Ser Leu Met Gln Asp Arg Asp Ala Ala Ser
    210                 215                 220

Ala Arg Ala Trp Pro Lys Met His Thr Val Asn Gly Tyr Val Asn Arg
225                 230                 235                 240

Ser Leu Pro Gly Leu Ile Gly Cys His Arg Lys Ser Val Tyr Trp His
                245                 250                 255

Val Ile Gly Met Gly Thr Thr Pro Glu Val His Ser Ile Phe Leu Glu
            260                 265                 270

Gly His Thr Phe Leu Val Arg Asn His Arg Gln Ala Ser Leu Glu Ile
            275                 280                 285

Ser Pro Ile Thr Phe Leu Thr Ala Gln Thr Leu Leu Met Asp Leu Gly
    290                 295                 300

Gln Phe Leu Leu Phe Cys His Ile Ser Ser His Gln His Asp Gly Met
305                 310                 315                 320

Glu Ala Tyr Val Lys Val Asp Ser Cys Pro Glu Glu Pro Gln Leu Arg
                325                 330                 335

Met Lys Asn Asn Glu Glu Ala Glu Asp Tyr Asp Asp Asp Leu Thr Asp
            340                 345                 350

Ser Glu Met Asp Val Val Arg Phe Asp Asp Asn Ser Pro Ser Phe
            355                 360                 365

Ile Gln Ile Arg Ser Val Ala Lys Lys His Pro Lys Thr Trp Val His
    370                 375                 380

Tyr Ile Ala Ala Glu Glu Asp Trp Asp Tyr Ala Pro Leu Val Leu
385                 390                 395                 400

Ala Pro Asp Asp Arg Ser Tyr Lys Ser Gln Tyr Leu Asn Asn Gly Pro
                405                 410                 415

Gln Arg Ile Gly Arg Lys Tyr Lys Lys Val Arg Phe Met Ala Tyr Thr
```

```
                420             425                 430
Asp Glu Thr Phe Lys Thr Arg Glu Ala Ile Gln His Glu Ser Gly Ile
            435                 440                 445

Leu Gly Pro Leu Leu Tyr Gly Glu Val Gly Asp Thr Leu Leu Ile Ile
            450                 455                 460

Phe Lys Asn Gln Ala Ser Arg Pro Tyr Asn Ile Tyr Pro His Gly Ile
465                 470                 475                 480

Thr Asp Val Arg Pro Leu Tyr Ser Arg Arg Leu Pro Lys Gly Val Lys
                485                 490                 495

His Leu Lys Asp Phe Pro Ile Leu Pro Gly Glu Ile Phe Lys Tyr Lys
            500                 505                 510

Trp Thr Val Thr Val Glu Asp Gly Pro Thr Lys Ser Asp Pro Arg Cys
            515                 520                 525

Leu Thr Arg Tyr Tyr Ser Ser Phe Val Asn Met Glu Arg Asp Leu Ala
            530                 535                 540

Ser Gly Leu Ile Gly Pro Leu Leu Ile Cys Tyr Lys Glu Ser Val Asp
545                 550                 555                 560

Gln Arg Gly Asn Gln Ile Met Ser Asp Lys Arg Asn Val Ile Leu Phe
                565                 570                 575

Ser Val Phe Asp Glu Asn Arg Ser Trp Tyr Leu Thr Glu Asn Ile Gln
            580                 585                 590

Arg Phe Leu Pro Asn Pro Ala Gly Val Gln Leu Glu Asp Pro Glu Phe
            595                 600                 605

Gln Ala Ser Asn Ile Met His Ser Ile Asn Gly Tyr Val Phe Asp Ser
            610                 615                 620

Leu Gln Leu Ser Val Cys Leu His Glu Val Ala Tyr Trp Tyr Ile Leu
625                 630                 635                 640

Ser Ile Gly Ala Gln Thr Asp Phe Leu Ser Val Phe Phe Ser Gly Tyr
                645                 650                 655

Thr Phe Lys His Lys Met Val Tyr Glu Asp Thr Leu Thr Leu Phe Pro
            660                 665                 670

Phe Ser Gly Glu Thr Val Phe Met Ser Met Glu Asn Pro Gly Leu Trp
            675                 680                 685

Ile Leu Gly Cys His Asn Ser Asp Phe Arg Asn Arg Gly Met Thr Ala
            690                 695                 700

Leu Leu Lys Val Ser Ser Cys Asp Lys Asn Thr Gly Asp Tyr Tyr Glu
705                 710                 715                 720

Asp Ser Tyr Glu Asp Ile Ser Ala Tyr Leu Leu Ser Lys Asn Asn Ala
                725                 730                 735

Ile Glu Pro Arg Ser Phe Ser Gln Asn Pro Pro Val Leu Lys Arg His
            740                 745                 750

Gln Arg Glu Ile Thr Arg Thr Thr Leu Gln Ser Asp Gln Glu Glu Ile
            755                 760                 765

Asp Tyr Asp Asp Thr Ile Ser Val Glu Met Lys Lys Glu Asp Phe Asp
            770                 775                 780

Ile Tyr Asp Glu Asp Glu Asn Gln Ser Pro Arg Ser Phe Gln Lys Lys
785                 790                 795                 800

Thr Arg His Tyr Phe Ile Ala Ala Val Glu Arg Leu Trp Asp Tyr Gly
                805                 810                 815

Met Ser Ser Ser Pro His Val Leu Arg Asn Arg Ala Gln Ser Gly Ser
            820                 825                 830

Val Pro Gln Phe Lys Lys Val Val Phe Gln Glu Phe Thr Asp Gly Ser
            835                 840                 845
```

-continued

Phe Thr Gln Pro Leu Tyr Arg Gly Glu Leu Asn Glu His Leu Gly Leu
    850                 855                 860

Leu Gly Pro Tyr Ile Arg Ala Glu Val Glu Asp Asn Ile Met Val Thr
865                 870                 875                 880

Phe Arg Asn Gln Ala Ser Arg Pro Tyr Ser Phe Tyr Ser Ser Leu Ile
                885                 890                 895

Ser Tyr Glu Glu Asp Gln Arg Gln Gly Ala Glu Pro Arg Lys Asn Phe
            900                 905                 910

Val Lys Pro Asn Glu Thr Lys Thr Tyr Phe Trp Lys Val Gln His His
        915                 920                 925

Met Ala Pro Thr Lys Asp Glu Phe Asp Cys Lys Ala Trp Ala Tyr Phe
    930                 935                 940

Ser Asp Val Asp Leu Glu Lys Asp Val His Ser Gly Leu Ile Gly Pro
945                 950                 955                 960

Leu Leu Val Cys His Thr Asn Thr Leu Asn Pro Ala His Gly Arg Gln
                965                 970                 975

Val Thr Val Gln Glu Phe Ala Leu Phe Phe Thr Ile Phe Asp Glu Thr
            980                 985                 990

Lys Ser Trp Tyr Phe Thr Glu Asn Met Glu Arg Asn Cys Arg Ala Pro
        995                 1000                1005

Cys Asn Ile Gln Met Glu Asp Pro Thr Phe Lys Glu Asn Tyr Arg
    1010                1015                1020

Phe His Ala Ile Asn Gly Tyr Ile Met Asp Thr Leu Pro Gly Leu
    1025                1030                1035

Val Met Ala Gln Asp Gln Arg Ile Arg Trp Tyr Leu Leu Ser Met
    1040                1045                1050

Gly Ser Asn Glu Asn Ile His Ser Ile His Phe Ser Gly His Val
    1055                1060                1065

Phe Thr Val Arg Lys Lys Glu Glu Tyr Lys Met Ala Leu Tyr Asn
    1070                1075                1080

Leu Tyr Pro Gly Val Phe Glu Thr Val Glu Met Leu Pro Ser Lys
    1085                1090                1095

Ala Gly Ile Trp Arg Val Glu Cys Leu Ile Gly Glu His Leu His
    1100                1105                1110

Ala Gly Met Ser Thr Leu Phe Leu Val Tyr Ser Asn Lys Cys Gln
    1115                1120                1125

Thr Pro Leu Gly Met Ala Ser Gly His Ile Arg Asp Phe Gln Ile
    1130                1135                1140

Thr Ala Ser Gly Gln Tyr Gly Gln Trp Ala Pro Lys Leu Ala Arg
    1145                1150                1155

Leu His Tyr Ser Gly Ser Ile Asn Ala Trp Ser Thr Lys Glu Pro
    1160                1165                1170

Phe Ser Trp Ile Lys Val Asp Leu Leu Ala Pro Met Ile Ile His
    1175                1180                1185

Gly Ile Lys Thr Gln Gly Ala Arg Gln Lys Phe Ser Ser Leu Tyr
    1190                1195                1200

Ile Ser Gln Phe Ile Ile Met Tyr Ser Leu Asp Gly Lys Lys Trp
    1205                1210                1215

Gln Thr Tyr Arg Gly Asn Ser Thr Gly Thr Leu Met Val Phe Phe
    1220                1225                1230

Gly Asn Val Asp Ser Ser Gly Ile Lys His Asn Ile Phe Asn Pro
    1235                1240                1245

```
Pro Ile Ala Arg Tyr Ile Arg Leu His Pro Thr His Tyr Ser
    1250                1255                1260

Ile Arg Ser Thr Leu Arg Met Glu Leu Met Gly Cys Asp Leu Asn
    1265                1270                1275

Ser Cys Ser Met Pro Leu Gly Met Glu Ser Lys Ala Ile Ser Asp
    1280                1285                1290

Ala Gln Ile Thr Ala Ser Ser Tyr Phe Thr Asn Met Phe Ala Thr
    1295                1300                1305

Trp Ser Pro Ser Lys Ala Arg Leu His Leu Gln Gly Arg Ser Asn
    1310                1315                1320

Ala Trp Arg Pro Gln Val Asn Asn Pro Lys Glu Trp Leu Gln Val
    1325                1330                1335

Asp Phe Gln Lys Thr Met Lys Val Thr Gly Val Thr Thr Gln Gly
    1340                1345                1350

Val Lys Ser Leu Leu Thr Ser Met Tyr Val Lys Glu Phe Leu Ile
    1355                1360                1365

Ser Ser Ser Gln Asp Gly His Gln Trp Thr Leu Phe Phe Gln Asn
    1370                1375                1380

Gly Lys Val Lys Val Phe Gln Gly Asn Gln Asp Ser Phe Thr Pro
    1385                1390                1395

Val Val Asn Ser Leu Asp Pro Pro Leu Leu Thr Arg Tyr Leu Arg
    1400                1405                1410

Ile His Pro Gln Ser Trp Val His Gln Ile Ala Leu Arg Met Glu
    1415                1420                1425

Val Leu Gly Cys Glu Ala Gln Asp Leu Tyr
    1430                1435

<210> SEQ ID NO 3
<211> LENGTH: 227
<212> TYPE: PRT
<213> ORGANISM: Homo sapiens

<400> SEQUENCE: 3

Asp Lys Thr His Thr Cys Pro Pro Cys Pro Ala Pro Glu Leu Leu Gly
1               5                   10                  15

Gly Pro Ser Val Phe Leu Phe Pro Pro Lys Pro Lys Asp Thr Leu Met
                20                  25                  30

Ile Ser Arg Thr Pro Glu Val Thr Cys Val Val Val Asp Val Ser His
            35                  40                  45

Glu Asp Pro Glu Val Lys Phe Asn Trp Tyr Val Asp Gly Val Glu Val
        50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Ser Arg Asp Glu Leu Thr Lys Asn Gln Val Ser
    130                 135                 140

Leu Thr Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175
```

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
            195                 200                 205

His Glu Ala Leu His Asn His Tyr Thr Gln Lys Ser Leu Ser Leu Ser
210                 215                 220

Pro Gly Lys
225

<210> SEQ ID NO 4
<211> LENGTH: 223
<212> TYPE: PRT
<213> ORGANISM: Homo sapiens

<400> SEQUENCE: 4

Val Glu Cys Pro Pro Cys Pro Ala Pro Val Ala Gly Pro Ser Val
1               5                   10                  15

Phe Leu Phe Pro Pro Lys Pro Lys Asp Gln Leu Met Ile Ser Arg Thr
            20                  25                  30

Pro Glu Val Thr Cys Val Val Val Asp Val Ser His Glu Asp Pro Glu
        35                  40                  45

Val Gln Phe Asn Trp Tyr Val Asp Gly Val Glu Val His Asn Ala Lys
    50                  55                  60

Thr Lys Pro Arg Glu Glu Gln Phe Asn Ser Thr Phe Arg Val Val Ser
65                  70                  75                  80

Val Leu Thr Val Val His Gln Asp Trp Leu Asn Gly Lys Glu Tyr Lys
                85                  90                  95

Cys Lys Val Ser Asn Lys Gly Leu Pro Ala Ser Ile Glu Lys Thr Ile
            100                 105                 110

Ser Lys Thr Lys Gly Gln Pro Arg Glu Pro Gln Val Tyr Thr Leu Pro
        115                 120                 125

Pro Ser Arg Glu Glu Met Thr Lys Asn Gln Val Ser Leu Thr Cys Leu
    130                 135                 140

Val Lys Gly Phe Tyr Pro Ser Asp Ile Ala Val Glu Trp Glu Ser Asn
145                 150                 155                 160

Gly Gln Pro Glu Asn Asn Tyr Lys Thr Thr Pro Pro Met Leu Asp Ser
                165                 170                 175

Asp Gly Ser Phe Phe Leu Tyr Ser Lys Leu Thr Val Asp Lys Ser Arg
            180                 185                 190

Trp Gln Gln Gly Asn Val Phe Ser Cys Ser Val Leu His Glu Ala Leu
        195                 200                 205

His Asn His Tyr Thr Gln Lys Ser Leu Ser Leu Ser Pro Gly Lys
    210                 215                 220

<210> SEQ ID NO 5
<211> LENGTH: 229
<212> TYPE: PRT
<213> ORGANISM: Homo sapiens

<400> SEQUENCE: 5

Glu Ser Lys Tyr Gly Pro Pro Cys Pro Ser Cys Pro Ala Pro Glu Phe
1               5                   10                  15

Leu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

```
Ser Gln Glu Asp Pro Glu Val Gln Phe Asn Trp Tyr Val Asp Gly Val
    50                  55                  60

Glu Val His Asn Ala Lys Thr Lys Pro Arg Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225

<210> SEQ ID NO 6
<211> LENGTH: 16
<212> TYPE: PRT
<213> ORGANISM: Artificial Sequence
<220> FEATURE:
<223> OTHER INFORMATION: Flexible peptide segment

<400> SEQUENCE: 6

Gly Ser Gly Gly Gly Ser Gly Gly Gly Ser Gly Gly Gly Ser
1               5                   10                  15

<210> SEQ ID NO 7
<211> LENGTH: 27
<212> TYPE: PRT
<213> ORGANISM: Artificial Sequence
<220> FEATURE:
<223> OTHER INFORMATION: Flexible peptide segment

<400> SEQUENCE: 7

Gly Ser Gly Gly Gly Gly Ser Gly Gly Gly Gly Ser Gly Gly Gly Gly
1               5                   10                  15

Ser Gly Gly Gly Gly Ser Gly Gly Gly Gly Ser
            20                  25

<210> SEQ ID NO 8
<211> LENGTH: 20
<212> TYPE: PRT
<213> ORGANISM: Artificial Sequence
<220> FEATURE:
<223> OTHER INFORMATION: Flexible peptide segment

<400> SEQUENCE: 8

Gly Gly Gly Gly Ser Gly Gly Gly Gly Ser Gly Gly Gly Gly Ser Gly
1               5                   10                  15
```

Gly Gly Gly Ser
        20

<210> SEQ ID NO 9
<211> LENGTH: 37
<212> TYPE: PRT
<213> ORGANISM: Artificial Sequence
<220> FEATURE:
<223> OTHER INFORMATION: Flexible peptide segment

<400> SEQUENCE: 9

Gly Ser Gly Gly Gly Gly Ser Gly Gly Gly Gly Ser Gly Gly Gly Gly
1               5                   10                  15

Ser Gly Gly Gly Gly Ser Gly Gly Gly Gly Ser Gly Gly Gly Gly Ser
            20                  25                  30

Gly Gly Gly Gly Ser
        35

<210> SEQ ID NO 10
<211> LENGTH: 20
<212> TYPE: PRT
<213> ORGANISM: Artificial Sequence
<220> FEATURE:
<223> OTHER INFORMATION: Flexible peptide segment

<400> SEQUENCE: 10

Gly Gly Gly Ser Gly Gly Gly Ser Gly Gly Gly Ser Gly Gly Gly Ser
1               5                   10                  15

Gly Gly Gly Ser
        20

<210> SEQ ID NO 11
<211> LENGTH: 33
<212> TYPE: PRT
<213> ORGANISM: Artificial Sequence
<220> FEATURE:
<223> OTHER INFORMATION: Rigid peptide segment

<400> SEQUENCE: 11

Pro Arg Phe Gln Asp Ser Ser Ser Ser Lys Ala Pro Pro Pro Ser Leu
1               5                   10                  15

Pro Ser Pro Ser Arg Leu Pro Gly Pro Ser Asp Thr Pro Ile Leu Pro
            20                  25                  30

Gln

<210> SEQ ID NO 12
<211> LENGTH: 28
<212> TYPE: PRT
<213> ORGANISM: Artificial Sequence
<220> FEATURE:
<223> OTHER INFORMATION: Rigid peptide segment

<400> SEQUENCE: 12

Ser Ser Ser Ser Lys Ala Pro Pro Pro Ser Leu Pro Ser Pro Ser Arg
1               5                   10                  15

Leu Pro Gly Pro Ser Asp Thr Pro Ile Leu Pro Gln
            20                  25

<210> SEQ ID NO 13
<211> LENGTH: 10
<212> TYPE: PRT
<213> ORGANISM: Artificial Sequence
<220> FEATURE:
<223> OTHER INFORMATION: Rigid peptide segment

```
<400> SEQUENCE: 13

Ser Ser Ser Ser Lys Ala Pro Pro Pro Ser
1               5                   10

<210> SEQ ID NO 14
<211> LENGTH: 14
<212> TYPE: PRT
<213> ORGANISM: Artificial Sequence
<220> FEATURE:
<223> OTHER INFORMATION: Rigid peptide segment

<400> SEQUENCE: 14

Ser Arg Leu Pro Gly Pro Ser Asp Thr Pro Ile Leu Pro Gln
1               5                   10

<210> SEQ ID NO 15
<211> LENGTH: 55
<212> TYPE: PRT
<213> ORGANISM: Artificial Sequence
<220> FEATURE:
<223> OTHER INFORMATION: Peptide linker

<400> SEQUENCE: 15

Gly Ser Gly Gly Gly Gly Ser Gly Gly Gly Gly Ser Gly Gly Gly
1               5                   10                  15

Ser Gly Gly Gly Ser Gly Gly Gly Gly Ser Ser Ser Ser Ser Lys
                20                  25                  30

Ala Pro Pro Pro Ser Leu Pro Ser Pro Ser Arg Leu Pro Gly Pro Ser
                35                  40                  45

Asp Thr Pro Ile Leu Pro Gln
                50                  55
```